US008555251B2

(12) United States Patent
Yamashita

(10) Patent No.: US 8,555,251 B2
(45) Date of Patent: *Oct. 8, 2013

(54) SIGNAL PROCESSING APPARATUS WITH USER-CONFIGURABLE CIRCUIT CONFIGURATION

(75) Inventor: Kosei Yamashita, Kanagawa (JP)

(73) Assignee: Sony Corporation, Tokyo (JP)

( * ) Notice: Subject to any disclaimer, the term of this patent is extended or adjusted under 35 U.S.C. 154(b) by 1870 days.

This patent is subject to a terminal disclaimer.

(21) Appl. No.: 11/386,007

(22) Filed: Mar. 21, 2006

(65) Prior Publication Data

US 2006/0218525 A1 Sep. 28, 2006

(30) Foreign Application Priority Data

Mar. 24, 2005 (JP) ................................. 2005-085348

(51) Int. Cl.
G06F 9/44 (2006.01)
G06F 17/00 (2006.01)
G06F 15/00 (2006.01)

(52) U.S. Cl.
USPC ............. 717/121; 717/120; 700/94; 704/200; 712/34; 712/35; 712/220

(58) Field of Classification Search
USPC ... 717/100, 120, 121; 700/94; 704/200–278; 712/34, 35, 220–248
See application file for complete search history.

(56) References Cited

U.S. PATENT DOCUMENTS

| | | | | |
|---|---|---|---|---|
| 4,378,577 A | * | 3/1983 | Chamberlin | 369/27.1 |
| 4,796,179 A | * | 1/1989 | Lehman et al. | 700/86 |
| 5,331,111 A | * | 7/1994 | O'Connell | 84/602 |
| 5,537,601 A | * | 7/1996 | Kimura et al. | 712/35 |
| 5,544,297 A | * | 8/1996 | Milne et al. | 715/201 |
| 5,883,804 A | * | 3/1999 | Christensen | 700/94 |
| 5,913,038 A | * | 6/1999 | Griffiths | 709/231 |

(Continued)

FOREIGN PATENT DOCUMENTS

| | | |
|---|---|---|
| EP | 1186997 A2 | 3/2002 |
| EP | 1605350 A2 | 12/2005 |

(Continued)

OTHER PUBLICATIONS

Reiter et al., "A plug-in based audio rendering concept for an MPEG-4 Audio subset," 2004, IEEE, p. 55-60.*

(Continued)

Primary Examiner — Qing Chen
(74) Attorney, Agent, or Firm — Wolf, Greenfield & Sacks, P.C.

(57) ABSTRACT

A signal processing apparatus for performing signal processing including a plurality of steps in data units by software signal processing includes signal processing modules performing the steps, a circuit configuration information storing and managing unit storing the signal processing modules and circuit configuration information, a signal processing order determining unit determining a signal processing order by performing path routing, a signal processing executing unit executing the signal processing in the determined order, and a circuit configuration changing unit changing circuit configuration information and causing the signal processing order determining unit to re-execute path routing to determine a signal processing order for the changed circuit configuration information during a period from the end of the software signal processing in the data unit to the beginning of the subsequent data unit. Software signal processing from the beginning of the subsequent data unit is performed with the changed circuit configuration.

9 Claims, 37 Drawing Sheets

(56) References Cited

U.S. PATENT DOCUMENTS

| | | | |
|---|---|---|---|
| 5,929,934 A * | 7/1999 | Nakasaka et al. | 348/590 |
| 5,999,906 A * | 12/1999 | Mercs et al. | 704/500 |
| 6,185,535 B1 * | 2/2001 | Hedin et al. | 704/270 |
| 6,799,180 B1 * | 9/2004 | McGrath et al. | 1/1 |
| 6,829,290 B1 * | 12/2004 | Schmidl et al. | 375/147 |
| 6,937,969 B1 * | 8/2005 | Vandersteen et al. | 703/14 |
| 6,983,464 B1 * | 1/2006 | Bhattacharya et al. | 719/318 |
| 7,080,386 B2 * | 7/2006 | Thrift et al. | 719/328 |
| 7,369,906 B2 * | 5/2008 | Frindle | 700/94 |
| 7,379,877 B2 * | 5/2008 | Lehtimaki | 704/500 |
| 7,441,020 B2 * | 10/2008 | Dideriksen et al. | 709/221 |
| 7,577,940 B2 * | 8/2009 | Amin et al. | 717/120 |
| 7,609,653 B2 * | 10/2009 | Amin et al. | 370/254 |
| 7,742,609 B2 * | 6/2010 | Yeakel et al. | 381/119 |
| 7,752,189 B2 * | 7/2010 | Yamashita | 707/706 |
| 2001/0037408 A1 * | 11/2001 | Thrift et al. | 709/310 |
| 2002/0065568 A1 * | 5/2002 | Silfvast et al. | 700/94 |
| 2004/0030425 A1 * | 2/2004 | Yeakel et al. | 700/94 |
| 2004/0045007 A1 * | 3/2004 | Boland et al. | 719/315 |
| 2004/0254796 A1 * | 12/2004 | Lehtimaki | 704/500 |
| 2004/0267940 A1 * | 12/2004 | Dideriksen et al. | 709/228 |
| 2005/0144587 A1 * | 6/2005 | Bryant | 717/111 |
| 2005/0195752 A1 * | 9/2005 | Amin et al. | 370/254 |
| 2005/0198623 A1 * | 9/2005 | Amin et al. | 717/144 |
| 2005/0278451 A1 * | 12/2005 | Yamashita | 709/229 |
| 2006/0184597 A1 * | 8/2006 | Yamashita et al. | 708/400 |

FOREIGN PATENT DOCUMENTS

| | | |
|---|---|---|
| JP | 2004-348327 A | 12/2004 |
| JP | 10-2005-0026058 A | 3/2005 |
| WO | WO 92/08196 A1 | 5/1992 |

OTHER PUBLICATIONS

Winegarden, Steven, "Bus Architecture of a System on a Chip with User-Configurable System Logic," Mar. 2000, IEEE, pp. 425-433.*

* cited by examiner

USER INSTRUCTION    FIG. 10

(5) INSTRUCT CHILD GRAPH 803 TO CREATE INPUT PORT 0 (EXTERNAL) -----> 

CHILD GRAPH 803 GENERATES INPUT PORT 0 (EXTERNAL) AND REGISTERS IT IN CHILD GRAPH 803 — S111

CHILD GRAPH 803 AUTOMATICALLY GENERATES OUTPUT PORT 0 (INTERNAL) CORRESPONDING TO INPUT PORT 0 (EXTERNAL) AND REGISTERS IT IN CHILD GRAPH 803 — S112

EXECUTE PATH ROUTING ALGORITHM (GRAPH 800) — S113

(6) INSTRUCT CHILD GRAPH 803 TO CREATE OUTPUT PORT 0 (EXTERNAL) ----->

CHILD GRAPH 803 GENERATES OUTPUT PORT 0 (EXTERNAL) AND REGISTERS IT IN CHILD GRAPH 803 — S114

CHILD GRAPH 803 AUTOMATICALLY GENERATES INPUT PORT 0 (INTERNAL) CORRESPONDING TO OUTPUT PORT 0 (EXTERNAL) AND REGISTERS IT IN CHILD GRAPH 803 — S115

EXECUTE PATH ROUTING ALGORITHM (GRAPH 800) — S116

(7) INSTRUCT CHILD GRAPH 803 TO CREATE PLUGIN 804 ----->

GENERATE PLUGIN 804 IN CHILD GRAPH 803 AND REGISTER IT IN CHILD GRAPH 803 — S117

EXECUTE PATH ROUTING ALGORITHM (GRAPH 800) — S118

(8) INSTRUCT CHILD GRAPH 803 TO CREATE PLUGIN 805 ----->

GENERATE PLUGIN 805 IN CHILD GRAPH 803 AND REGISTER IT IN CHILD GRAPH 803 — S119

EXECUTE PATH ROUTING ALGORITHM (CHILD GRAPH 803) — S120

| NODE INDEX (SIGNAL PROCESSING ORDER) | NODE |
|---|---|
| 1 | NODE NO. 0 |
| 2 | NODE NO. 2 |
| 3 | NODE NO. 4 |
| 4 | NODE NO. 6 |
| 5 | NODE NO. 1 |
| 6 | NODE NO. 3 |
| 7 | NODE NO. 5 |

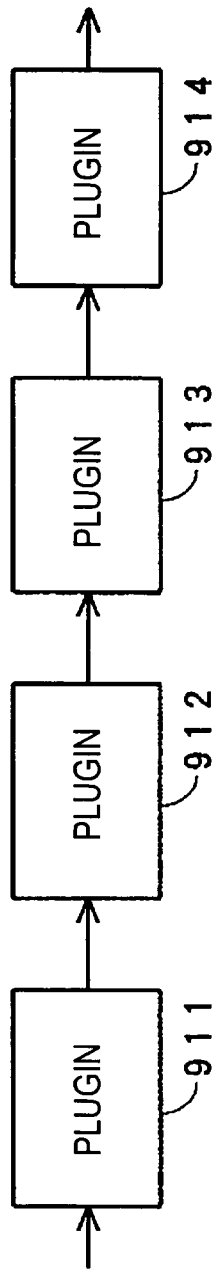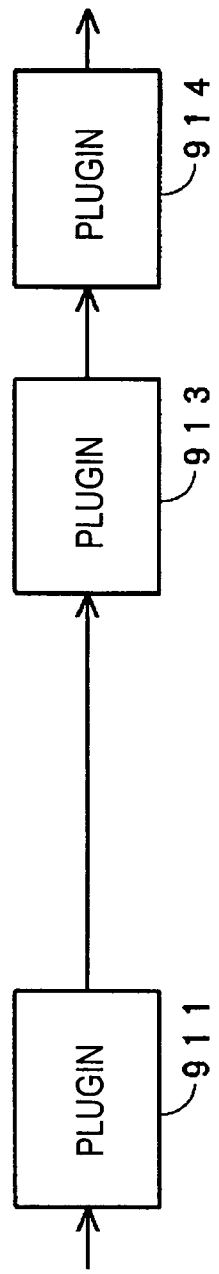

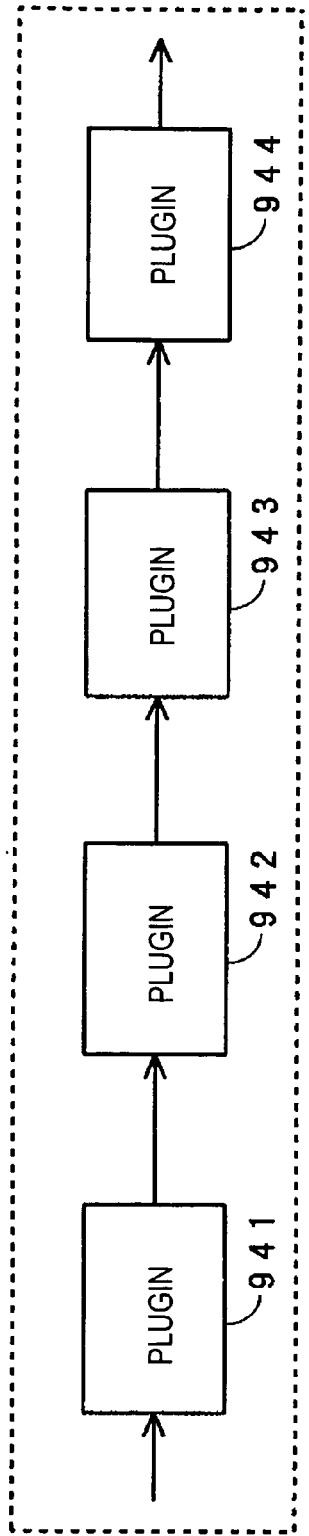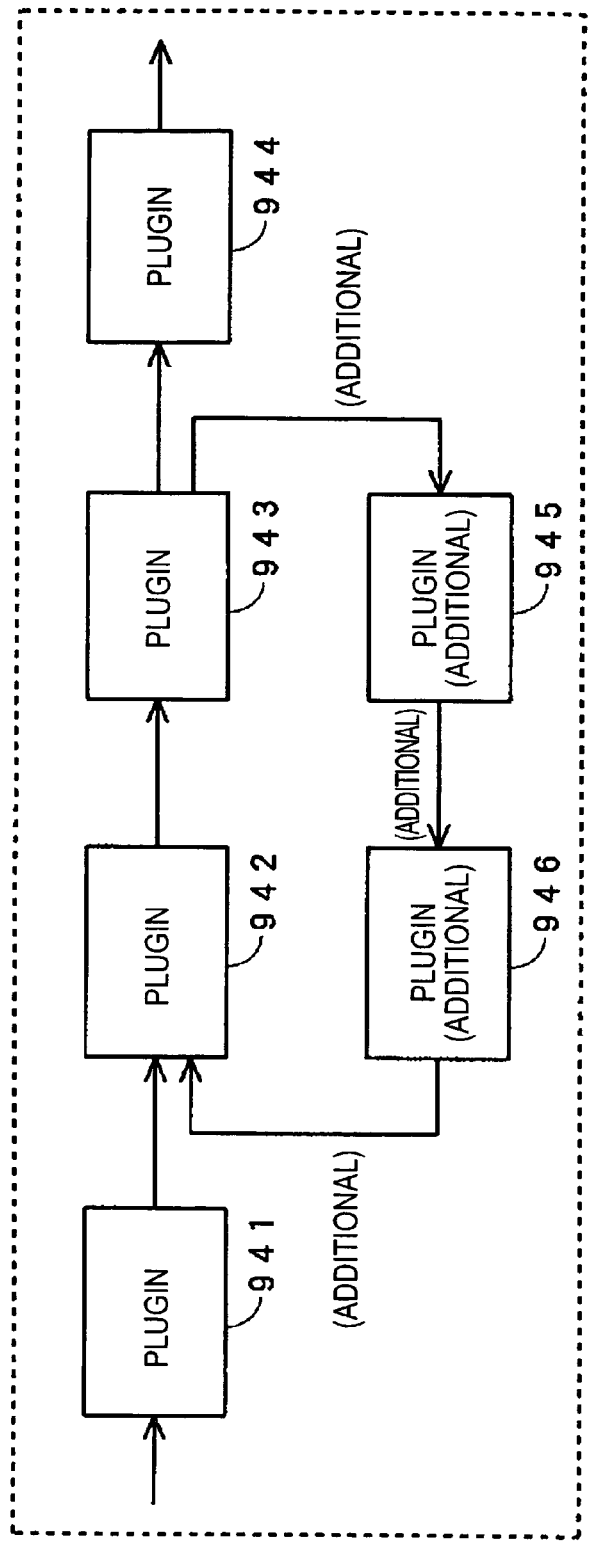

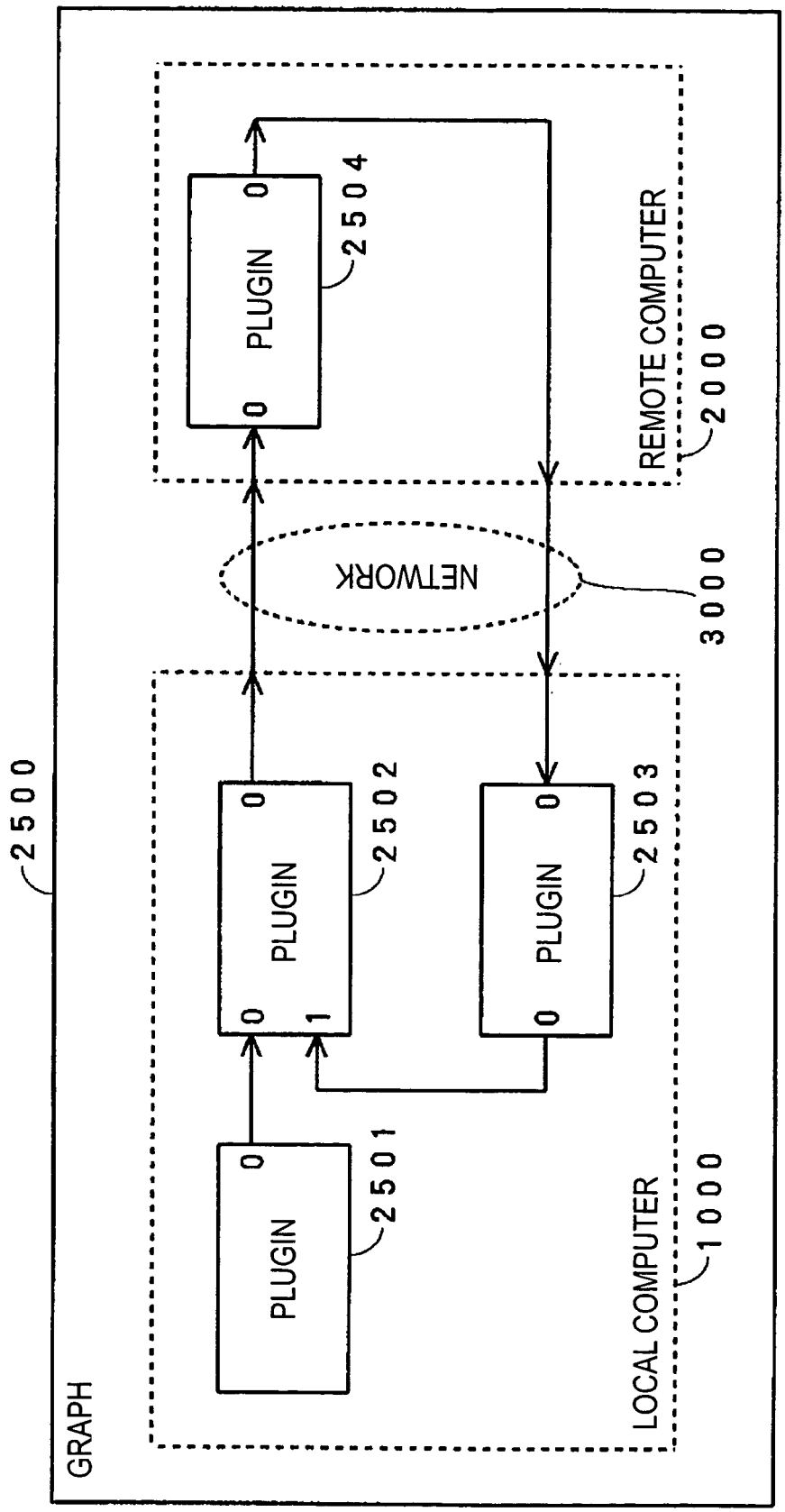

SIGNAL PROCESSING APPARATUS WITH USER-CONFIGURABLE CIRCUIT CONFIGURATION

CROSS REFERENCES TO RELATED APPLICATIONS

The present invention contains subject matter related to Japanese Patent Application JP 2005-085348 filed in the Japanese Patent Office on Mar. 24, 2005, the entire contents of which are incorporated herein by reference.

BACKGROUND OF THE INVENTION

1. Field of the Invention

The present invention relates to a signal processing apparatus for performing signal processing including a plurality of unit signal-processing steps by means of software processing.

2. Description of the Related Art

Recently, increasingly high-performance computers have been commercially available, and moving pictures and music have been reproducible on the computers, which was difficult in the past. Particularly, there have been available video and audio signal processing applications capable of easily performing real-time signal processing by means of software processing without using traditional dedicated signal processing devices, such as digital signal processors (DSPs), or dedicated hardware.

Such signal processing applications are supported by various types of signal processing middleware, such as Direct-Show which is a product of Microsoft® Corporation, MAT-LAB, which is a product of The MathWorks®, Inc., and Max/MSP, which is a product of Cycling '74.

With the use of such middleware, signal processing applications can comparatively easily implement sophisticated features. For example, audio features, such as recording and reproduction, input and output, mixing, and special effects, are implemented by means of signal processing applications. Video signal processing applications having sophisticated editing features, such as non-linear editing, have also been available.

Middleware systems with a plugin configuration are disclosed in Japanese Unexamined Patent Application Publications No. 2001-109628 and No. 7-302195. A plugin is a software application that carries out a modularized feature. This document deals with signal processing. A plugin is therefore a software application implementing a signal processing module.

A plugin allows a user to add on and use a desired signal processing module, as needed. While plugins are generally used individually, novel systems in which multiple features can be achieved by a combination of plugins have recently been developed. In the future, such multiple-plugin systems will become the mainstream of new added value systems.

SUMMARY OF THE INVENTION

It is useful to provide a signal processing apparatus that allows a user to flexibly and arbitrarily change the circuit configuration of the signal processing apparatus without interrupting signal processing and without interrupting a signal output. In audio signal processing for, e.g., live performance, changing the circuit configuration without interrupting the audio output operation makes it easy to apply audio special effect processing, such as reverb or distortion, to a specified part or not.

In order to change a circuit configuration of a signal processing apparatus with hardware structure without interrupting signal processing, it is conceivable that all expectable circuit configurations are preset and are switched by a switch or the like. Since all circuit configurations are preset, it is difficult to change to an unexpected circuit depending on the situation, leading to considerably low flexibility. Further, it is costly to preset all circuit configurations.

Even in a switchable hardware implementation that allows a user to download circuit configuration information, such as a field programmable gate array (FPGA) implementation, in principle, a considerable time may be needed to switch a circuit, and circuit consistency is not ensured before and after a circuit is switched, thus causing sound dropout or noise during circuit switching. It is difficult to dynamically switch a circuit configuration while continuously outputting audio signals.

In the above-described case where signal processing modules are combined to construct a signal processing apparatus, unlike the hardware structure, it is possible to change the circuit configuration of the signal processing circuit by changing software. The switch in the hardware structure is not used. Thus, the circuit configuration would be flexibly and arbitrarily changed, and, in principle, the noise generated during switching would be removed.

However, the following is to be noted. In software signal processing, generally, the signal processing is performed in units of packets to reduce the processing load. In a feed-forward circuit configuration, a signal flows in the forward direction, and dynamically switching the circuit configuration does not cause inconsistency of processed audio data even during packet processing.

In a circuit configuration including a feedback loop, however, simply switching the circuit configuration during packet processing causes inconsistency in the signal processing. This results from the causality constraint of a feedback loop in the theory of digital signal processing. Due to the causality constraint, a feedback loop circuit should successively perform processing in units of one sample even within a packet. In a circuit configuration including a mix of two types, i.e., the feed-forward type and the feedback loop type, signal processing for a feed-forward circuit is performed in units of packets, and signal processing for a feedback-loop circuit is performed in units of one sample. The two different types of control processing are therefore performed in the same packet time.

The problem is that in an environment including a mix of such two circuit types, simply switching a circuit without careful consideration causes inconsistency of processed audio data. A feed-forward circuit and a feedback-loop circuit have different switchable timing durations. If circuit switching is simply performed, the audio data processed in the original circuit configuration before switching and the audio data processed in the switched circuit configuration may be mixed in the same packet, leading to inconsistency of the processed audio data, thus causing problems, such as noise.

It is therefore desirable to provide a signal processing apparatus in which the circuit configuration of the signal processing apparatus can be changed without interrupting signal processing and without interrupting a signal output.

According to an embodiment of the present invention, a signal processing apparatus for performing signal processing including a plurality of unit signal-processing steps in processing data units by means of software signal processing, each processing data unit having a predetermined number of data samples, includes the following elements. A plurality of signal processing modules perform the unit signal-processing steps, respectively, by means of software processing. A circuit configuration information storing and managing unit stores and manages the plurality of signal processing modules and circuit configuration information represented by a virtual connection state of inputs and outputs of the plurality of signal processing modules. Signal processing order determining means determines a signal processing order of the plurality of signal processing modules forming the circuit configuration information stored in the circuit configuration information storing and managing unit by performing path routing. Signal processing executing means executes the signal processing by sequentially enabling the signal processing modules in the signal processing order determined by the signal processing order determining means. Circuit configuration changing means determines whether or not a circuit-configuration change request exists during the signal processing executed in the signal processing executing means. When detecting the circuit-configuration change request, the circuit configuration changing means changes the circuit configuration information stored in the circuit configuration information storing and managing unit, and causes the signal processing order determining means to re-execute the path routing to determine a signal processing order of the plurality of signal processing modules forming the changed circuit configuration information during a period from the end of the software signal processing in the processing data unit to the beginning of the subsequent processing data unit. Software signal processing from the beginning of the subsequent processing data unit is performed with the circuit configuration changed by the circuit configuration changing means.

According to the signal processing apparatus of the embodiment described above, software signal processing is sequentially performed by a plurality of signal processing modules in a predetermined signal processing order. This prevents each of the signal processing modules from causing a redundant processing delay, such as a delay caused by processing the data once stored in an asynchronous buffer.

When a circuit-configuration change request occurs during signal processing, during a period from the end of the software signal processing in the processing data unit to the beginning of the subsequent processing data unit, changed circuit configuration information is stored in the circuit configuration information storing and managing unit, and the signal processing order determining means is enabled to find a new signal processing order. The signal processing executing means executes the signal processing in the new signal processing order.

In this case, the circuit configuration is changed during a period between a given processing data unit to the subsequent processing data unit, and signal processing to be performed with the changed circuit configuration is started from the beginning of the subsequent processing data unit, rather than in the middle of the processing data unit. Therefore, a processing result obtained from the original circuit configuration and a processing result obtained from the changed circuit configuration are not mixed, thus ensuring that signals in processing data units are continuously subjected to signal processing even with a circuit configuration including a loop.

Accordingly, even during a signal processing operation, a circuit configuration can be changed without interrupting a signal output, and the signal processing operation can be continuously performed with the changed circuit configuration.

According to an embodiment of the present invention, therefore, it is possible to dynamically change a circuit configuration even during a signal processing operation. It is also possible to provide a signal processing apparatus in which there is no increase in signal processing delay when signal processing modules are connected in multiple stages. Further, it is possible to prevent, even in a signal processing circuit including a closed loop, a problem caused by dynamically changing the circuit configuration.

BRIEF DESCRIPTION OF THE DRAWINGS

FIG. 10 is a flowchart showing the exemplary circuit forming process in the signal processing apparatus according to the embodiment of the present invention;

FIG. 16 is a diagram showing an exemplary search result of the initial path routing algorithm forming the portion of the path routing algorithm in the signal processing apparatus according to the embodiment of the present invention;

FIGS. 24A and 24B are diagrams showing an exemplary change of the circuit configuration of the signal processing apparatus according to the embodiment of the present invention by deleting a plugin;

FIGS. 28A and 28B are diagrams showing an exemplary change of the circuit configuration of the signal processing apparatus according to the embodiment of the present invention;

FIG. 37 is a diagram showing a real-time distribution process for the signal processing apparatus according to the embodiment of the present invention.

DESCRIPTION OF THE PREFERRED EMBODIMENTS

A signal processing apparatus according to an embodiment of the present invention will be described hereinafter with reference to the drawings. The signal processing apparatus of the embodiment described below is implemented as a multi-plugin system having superior features to the same type of apparatus of the related art.

Existing multi-plugin systems have some drawbacks as follows:

(a) As plugins are connected in multiple stages, the processing delay (latency) proportionally increases.

(b) There are limitations in connecting between plugins, and it is difficult to connect them to form a feedback loop.

(c) It is difficult to change the connection between plugins during signal processing.

(d) Due to the low processing speed, it is difficult to carry out multiple features in real time.

(e) It is difficult to provide sample accuracy for control the synchronization between audio and video or the changing of parameters.

(f) Signal processing in units is only executable in the form of a closed loop on a single computer.

Several existing middleware systems partially overcome the foregoing drawbacks; however, there is no middleware system that simultaneously overcomes all the drawbacks mentioned above because some of them are in conflict with each other (that is, a problem is overcome, which then adversely affects another problem). For example, it is difficult to concurrently overcome the drawbacks (b) and (d).

Such drawbacks may sometimes cause a critical bottleneck for the incorporation of systems into traditional middleware products.

A signal processing apparatus, which will be described hereinbelow, is intended to overcome the foregoing drawbacks.

A signal processing apparatus according to an embodiment of the present invention is implemented as general-purpose signal processing middleware. The middleware is hereinafter referred to as a "software signal processor (SSP)". In the following embodiment, signal processing will be discussed in the context of audio signal processing.

Figure 2:
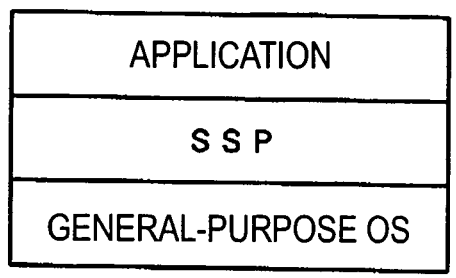
FIG. 2 is a diagram showing the signal processing apparatus according to the embodiment of the present invention.

The SSP, as shown in FIG. 2, resides between a general-purpose operating system (OS) and application software. The use of the SSP enables the application software to easily implement sophisticated signal processing features. The SSP is middleware that needs no graphical user interface (GUI), and is also useful for signal processing engines used for embedded equipment having no display device.

Overview of Signal Processing Apparatus According to Embodiment

The SSP, which is an implementation of a signal processing apparatus according to an embodiment of the present invention, is middleware with graph structure, and is basically implemented on a single computer. However, as discussed below, the SSP may be implemented on a plurality of computers connected via a network.

A signal processing apparatus according to an embodiment of the present invention, which is implemented as SSP, is composed of two parts; a graph module implemented by software (hereinafter referred to simply as a "graph") and a plugin module implemented by software (hereinafter referred to simply as a "plugin").

The plugin module is a signal processing module (software) for executing a unit signal-processing step, such as filter, equalizer, or gain control.

In this example, the plugin may have a plurality of input ports and a plurality of output ports. The plugin performs signal processing unique to the plugin on audio signals input from the input ports, and outputs the resulting signals from the output ports.

An output port of a plugin is connected to an input port of another plugin (this connection is a virtual connection, which means that an output signal from a plugin is input to another plugin, rather than a hardware connection. This virtual connection is hereinafter referred to as a "connection"). A plurality of plugins can be connected to implement complex signal processing features. The plugins are connected only by connecting an input port of a plugin to an output port of another plugin. The connection of input ports of plugins or output ports of plugins is not permitted.

The graph plays a role of an SSP system, and is adapted to include a plurality of plugins. In response to an operation input from a user, the graph generates or deletes a plugin, or connects ports of plugins, and holds resulting circuit configuration information. Inside the graph, therefore, an arbitrary circuit composed of plugins can be configured.

The graph, when a signal-processing function of this graph is called, sequentially transfers the received audio data with time information to the plugins included in the graph. The graph also plays a role of inputting and outputting audio data and attached information to the plugins.

Further, the graph includes the properties of a plugin. Thus, like a plugin, the graph has input and output ports so that the graph can be interconnected with another plugin. With the ability of a graph to include a plurality of plugins, once a graph is created, a circuit block (graph) composed of a plurality of plugins can be handled as a single plugin. The graph handled as a plugin has a function of handling a collection of circuits as a single component.

Exemplary Graph

Figure 3:
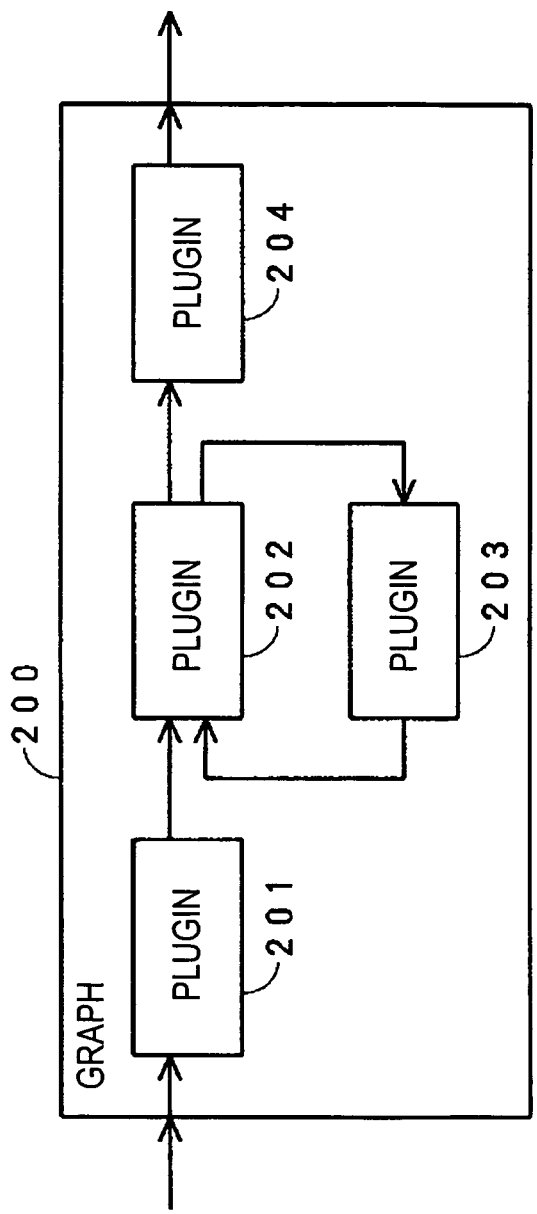
FIG. 3 is a diagram showing the signal processing apparatus according to the embodiment of the present invention.

FIG. 3 shows an exemplary graph including a plurality of plugins. A signal processing apparatus according to an embodiment of the present invention can be implemented by a personal computer (PC) so that a user input/output operation can be received and graphs, plugins, and connections thereof can graphically be displayed on a display unit of the PC according to the user instruction.

In the example shown in FIG. 3, a user first creates a basic root graph 200, and then creates a circuit composed of a plurality of plugins 201 to 204 in the graph 200. The plugins 201 to 204 may be selected from plugins pre-stored in the PC. The plugins are pre-stored in the form of templates, called object-oriented classes, before objects are actually generated.

For example, the user selects the plugins 201 to 204 from plugins stored in a storage unit of the PC, and dynamically generates (or maps) the selected plugins 201 to 204 in the graph 200. Object-oriented objects are thus generated. The user instructs that output ports and input ports of the plugins 201 to 204 be connected and that the graph 200 and the plugins 201 and 204 be connected, thereby setting up a circuit shown in FIG. 3.

The graph 200 holds circuit configuration information of the internal plugins 201 to 204. Once the user calls a signal-processing function of the root graph 200, signal-processing functions of the internal plugins 201 to 204 are successively called recursively from within the signal-processing function of the root graph 200, and calculations associated with the signal processing are sequentially performed. The propagation of the recursive signal-processing function calls is an implementation of the SSP system itself.

Figure 4:
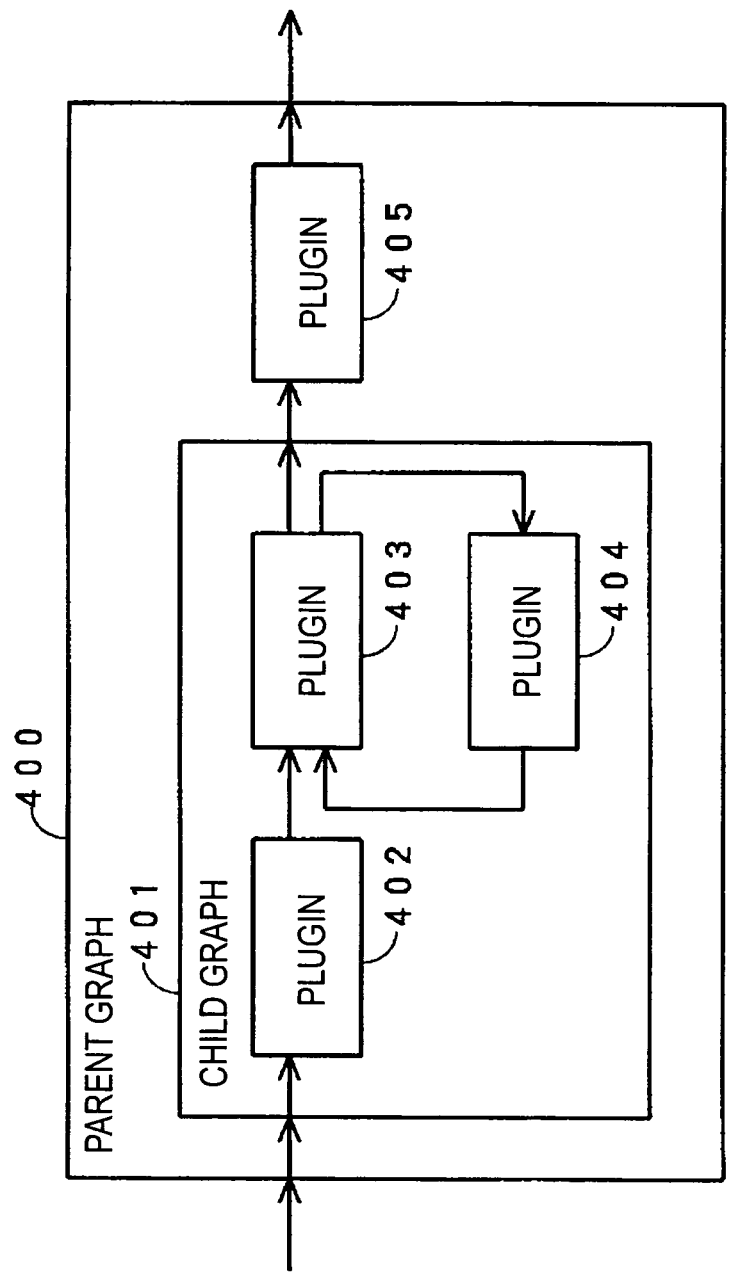
FIG. 4 is a diagram showing the signal processing apparatus according to the embodiment of the present invention.

FIG. 4 shows another exemplary graph including a plurality of plugins. As discussed above, the graph is also a plugin. Thus, the graph may recursively be constructed such that the graph includes a plugin different from the graph and the graph itself (a child graph). Like other plugins, the graph has input and output ports. The inside of the graph defines a black box, which is hidden from outside the graph. Inside the graph, a circuit block composed of a plurality of plugins is defined.

In FIG. 4, a parent graph 400 holds a graph 401, which is a child graph, and a plugin 405. The child graph 401 holds plugins 402, 403, and 404. The plugins 402, 403, and 404 inside the child graph 401 are hidden from the parent graph 400, and the child graph 401 is viewed as a single plugin.

First, the user creates a root graph (i.e., the parent graph 400), which is a root. Once the user calls a plugin generating and deleting function of the root graph 400, the child graph 401 and the plugin 405 are generated inside the root graph.

When the user calls a plugin generating and deleting function of the child graph 401, the plugins 402, 403, and 404 are generated in a similar manner.

In order to perform signal processing, first, the user calls a signal-processing function of the root graph 400. Then, signal-processing functions of the child graph 401 handled as a plugin and the plugin 405 inside the root graph 400 are successively called recursively from within the signal-processing function of the root graph 400, and calculations are sequentially performed. The order of the recursive signal-processing function calls is also determined by the graph.

In the child graph 401, the signal-processing function of the child graph 401 is first called. Then, the signal-processing functions of the plugins 402, 403, and 404 inside the child graph 401 are successively called recursively from within the signal-processing function of the child graph 401, and calculations are sequentially performed.

An implementation of the SSP system is the above-described graph operation itself. The graph, or the plugin itself, deals with the functions employed in the system, such as the generation and deletion of a plugin, the connection between plugins, the transfer of data between the plugins, the application of synchronization between time information and audio and video information to a plugin, sequential calls of signal-processing functions of the plugins, and the determination of the order of the function calls.

In the following description, the term system means a graph itself and the functionality of the graph.

Figure 5:
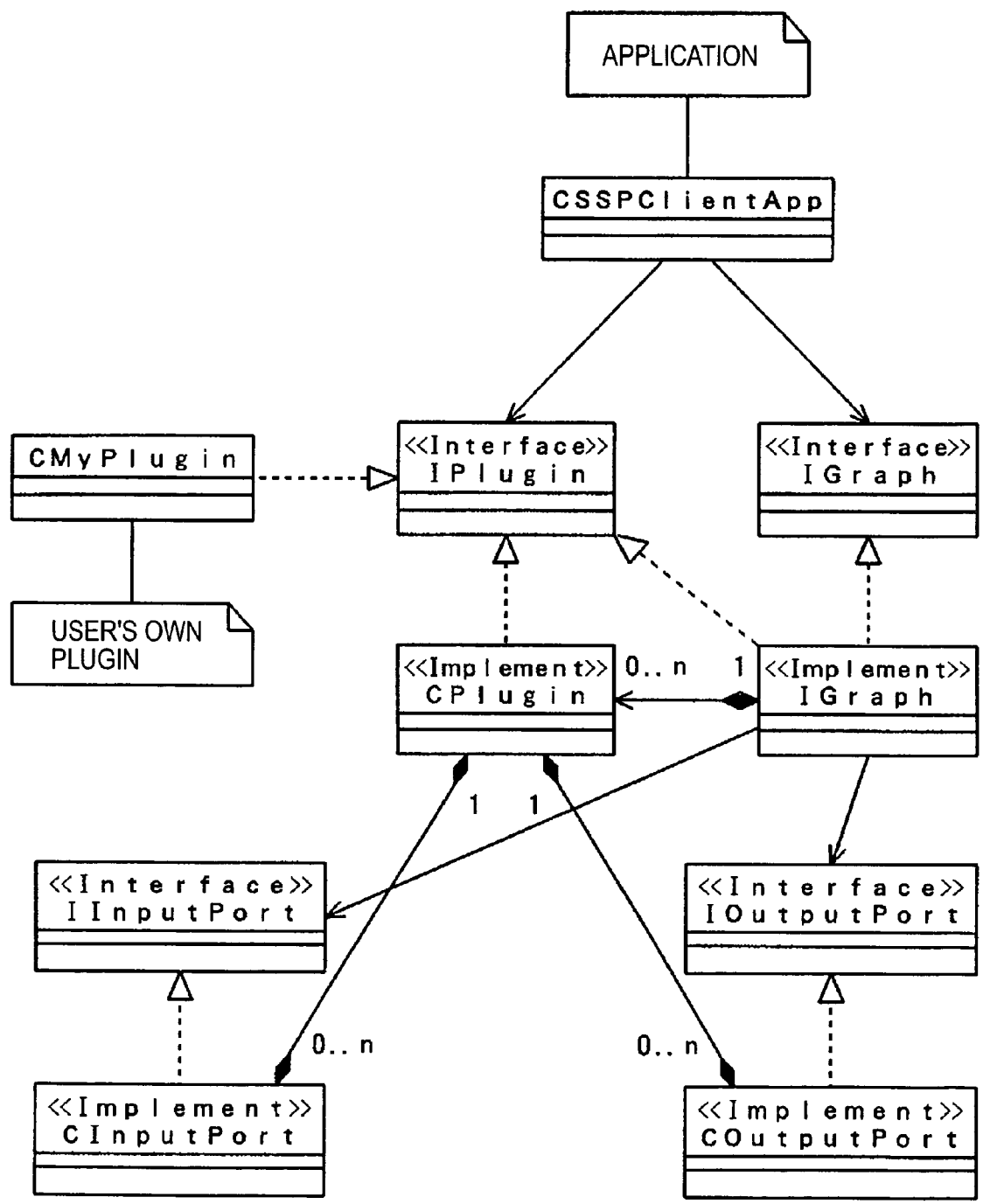
FIG. 5 is a diagram showing the signal processing apparatus according to the embodiment of the present invention.

FIG. 5 is a unified modeling language (UML) class diagram showing the overall structure of SSP middleware as an exemplary implementation. This diagram is represented in an object-oriented model, in which classes and interfaces (application programming interfaces (APIs)) are defined.

A plugin class (CPlugin) inherits a plugin interface (IPlugin), and implements a plugin-unique interface. The plugin class holds a plurality of input port classes (CInputPort) and output port classes (COutputPort).

There are multiple types of plugin classes according to their functions. For example, an adder plugin class is a plugin class for performing addition, and a multiplier plugin is a plugin class for performing multiplication. These classes are classified as user's own plugin (CMyPlugin) class. The user's own plugin class inherits the plugin class. In this example, the middleware user uses a plugin template to easily create his/her own plugin.

Next, a graph class will be described. A graph class (CGraph) includes a plurality of plugin classes. Like a plugin class, the graph class also inherits the plugin interface (IPlugin). The graph itself is also a plugin class.

The graph class thus has a recursive hierarchical structure in which a graph includes another graph and a plugin. This structure corresponds to a structure, called a composite pattern in general object-oriented design patterns.

Further, the graph also includes the properties of a plugin. Thus, like other plugins, the graph has input and output ports so that the graph can be interconnected with another plugin.

Once a graph object is created, a circuit block composed of a plurality of plugin objects is handled as a single component object.

The interfaces (APIs) of the graph class and the plugin class are defined. By calling the APIs from an SSP middleware client application, the objects can be controlled. The operation performed for the SSP system by the user is performed on these two types of objects.

Plugin Structure

Figure 6:
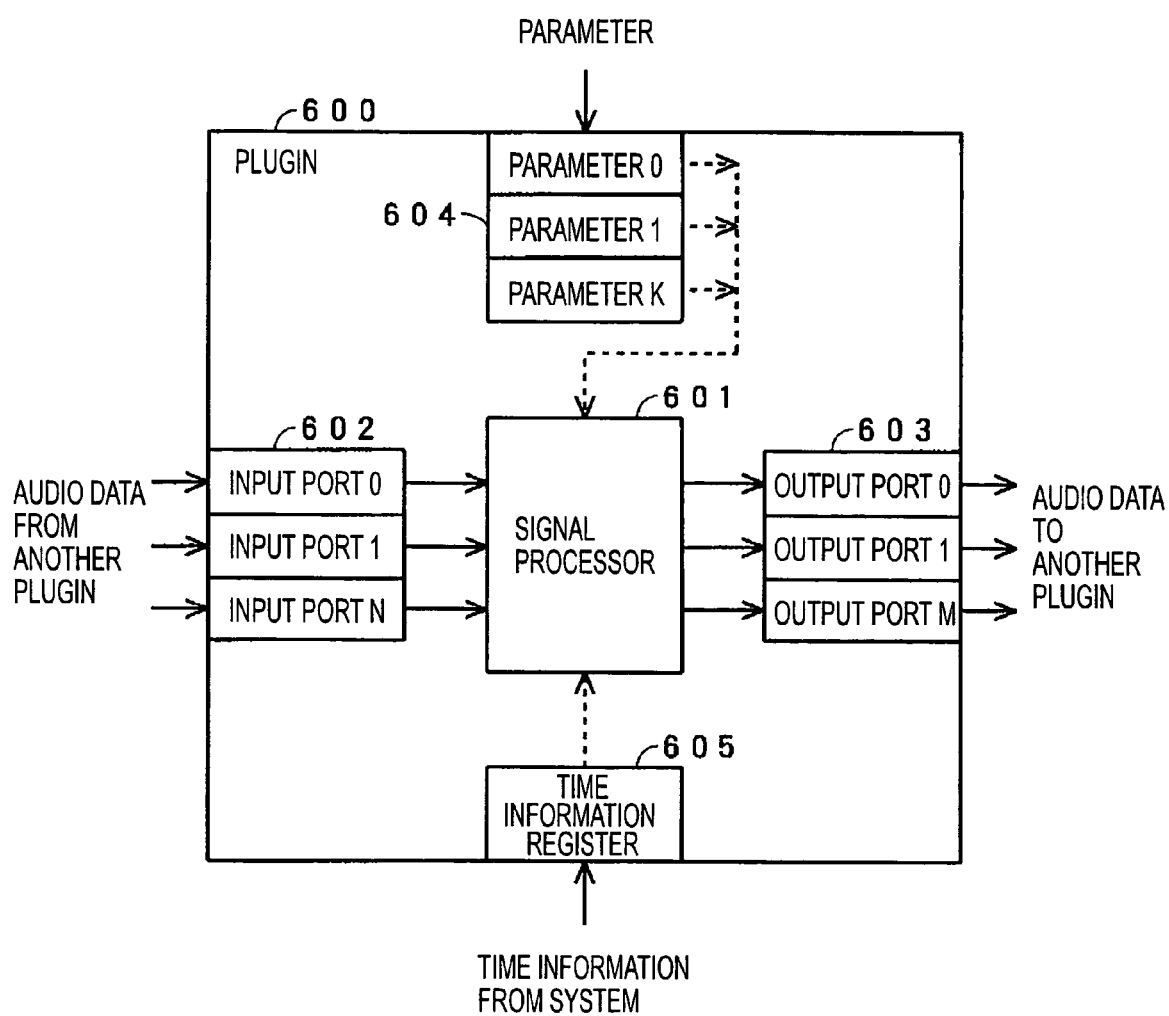
FIG. 6 is a diagram showing a plugin structure in the signal processing apparatus according to the embodiment of the present invention.

FIG. 6 shows an example structure of a plugin 600. As discussed above, the plugin 600 is a software signal processing module, and the components shown in FIG. 6 are provided as software functions rather than hardware.

As shown in FIG. 6, the plugin 600 can include a signal processor 601, zero or more input ports 602, and zero or more output ports 603. The plugin 600 can exchange a signal, e.g., audio data, with another plugin or other plugins via the input port or ports 602 and the output port or ports 603. In this example, an audio signal of one channel per port is input and output.

The user instructs the plugin 600 to add or delete the input port 602 and the output port 603, whereby the number of input ports 602 and output ports 603 of the plugin 600 can be dynamically changed even during signal processing. The input ports 602 and the output ports 603 are assigned identification numbers 0 to N, where N is any natural number, and 0 to M, where M is any natural number, respectively, according to the order in which the ports are added. The user selects identification numbers to specify one of the input ports 602 and one of the output ports 603.

The plugin 600 further includes zero or more parameter holding units (parameter buffers) 604 for storing zero or more parameters. The parameters are variable values for setting the amount of effects in signal processing and so forth, and are input by the user. For example, when the plugin 600 is implemented as an amplifier, the parameters include an amplification gain value. The user of the plugin 600 changes the parameter values of the plugin 600 to change the effects of signal processing.

In this example, the parameters are assigned identification numbers 0 to K, where K is any natural number. The user specifies the identification number of any parameter to change the content of the parameter buffer 604 at an arbitrary timing. In the mechanism of the plugin 600, a parameter given by the user is stored in the parameter buffer 604 inside the plugin 600. A parameter is read according to the time information synchronized with sample data provided from the system (i.e., the graph), and is then transmitted to the signal processor 601 for its signal processing.

The plugin 600 further includes a time information register 605 that constantly receives time information from the SSP system (i.e., the graph). The time information represents the number of accumulated counts of audio input or output data samples, starting at the start time of the SSP system (that is, the start time of the signal-processing function of the graph). The number of accumulated counts is the most basic time information in the SSP system.

In the SSP system of this embodiment, the time information and the audio input or output data are completely synchronized with each other. The SSP system supplies the time information to the plugin 600 together with the audio data. The time information therefore serves as a time stamp of the data samples of the audio data input to the plugin 600 for allowing the plugin 600 to know detailed time information, such as what sample in the absolute time domain the input data to be subjected to signal processing corresponds to. All plugins present inside the SSP system are synchronized with one another while referring to the absolute time, thus enabling the entire circuit in the SSP system to realize synchronous signal processing with sample accuracy.

The plugin 600 includes the signal processor 601. Audio data input from another plugin is transmitted to the signal processor 601 via the input port 602. The signal processor 601 performs signal processing unique to the plugin 600 on the audio data obtained from the input port 602 while referring to the time information or the parameter value sent to the signal processor 601. The audio data processed by the signal processor 601 is transmitted to another plugin via the output port 603.

In synchronization with the time information, the signal processing in the plugin 600 can be performed not only in units of one sample but also in units of a plurality of samples, e.g., in units of packets each packet having a plurality of samples. A plugin performs a signal-processing function call in processing data units. Thus, in performing signal processing in units of packets, one signal-processing function call is performed per packet, and the signal processing speed therefore increases due to the reduction in the number of function calls.

In this embodiment, audio data and video data are processed in such a manner that the audio data can be processed in synchronization with a video frame of the video data (this synchronization is hereinafter referred to as "AV synchronization"). The AV synchronization processing will be described in detail below. In a case of processing the audio data in synchronization with a video frame of the video data, vertical synchronization information Vs of the video data is transferred together with the time information to the plugin 600 from the system.

The plugin 600 checks the vertical synchronization information Vs synchronized with the time information from the system. When the timing of the vertical synchronization information Vs is detected, the plugin 600 performs an operation that provides synchronization between audio and video, e.g., an operation of changing a parameter transferred to the signal processor 601 from the parameter buffer 604, in synchronization with the timing of the vertical synchronization information Vs. This mechanism allows all parameters of all plugins in the circuit configured in the graph to be simultaneously updated in synchronization with the vertical synchronization information Vs. AV synchronization is thus achieved.

Example Graph Structure

Figure 7:
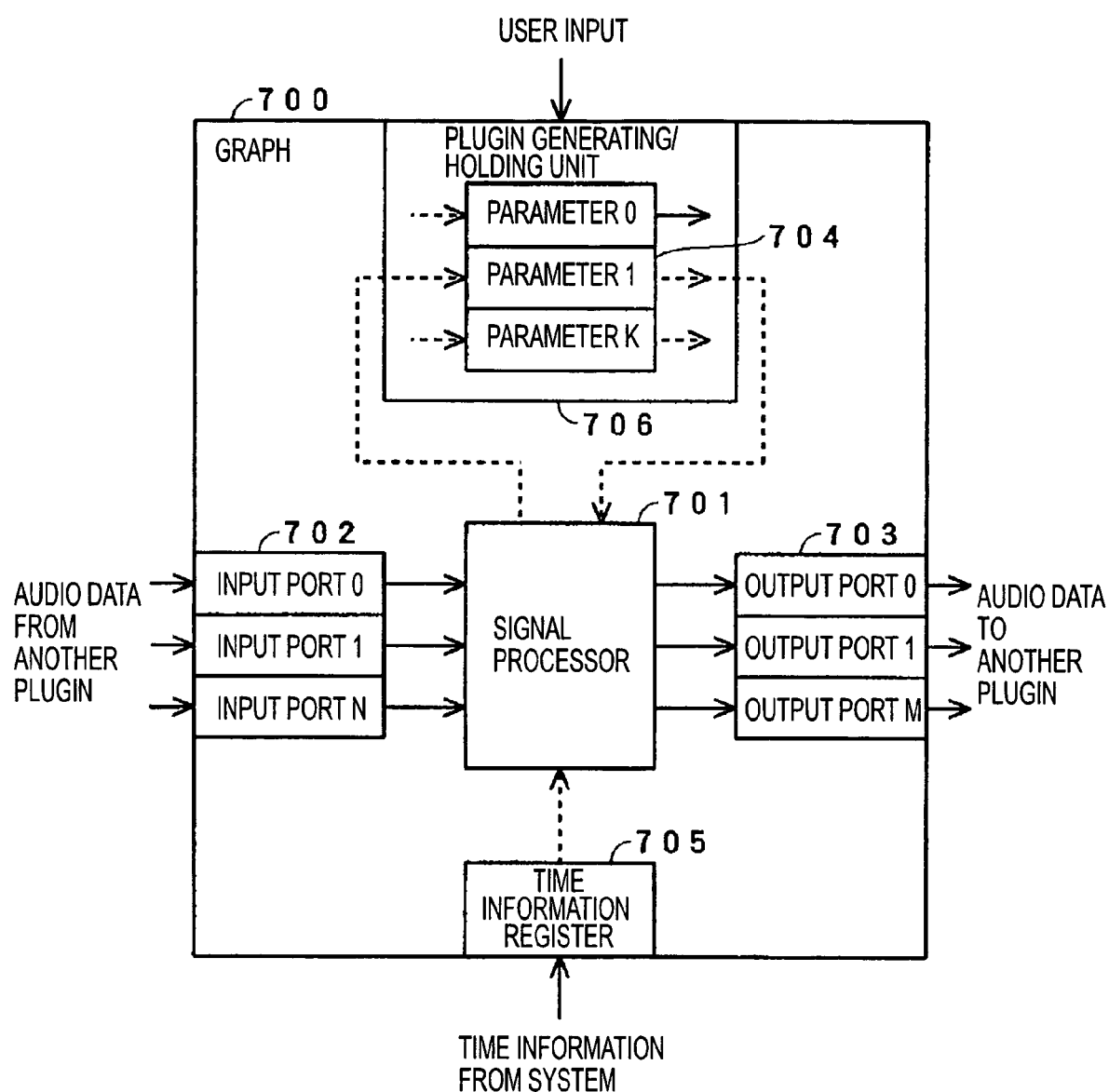
FIG. 7 is a diagram showing a graph structure in the signal processing apparatus according to the embodiment of the present invention.

FIG. 7 is a diagram showing an example structure of a graph 700. As discussed above, the graph 700 is a software signal processing module, and the components of the graph 700 shown in FIG. 7 are provided as software functions rather than hardware.

As discussed above, the graph 700 has the properties of a plugin, and includes a signal processor 701, an input port 702, an output port 703, a parameter buffer 704, and a time information register 705. The signal processor 701 reads a plugin included in the graph 700. The functions of the input port 702, the output port 703, the parameter buffer 704, and the time information register 705 are similar to those of the corresponding components in the plugin 600 described above with reference to FIG. 6, and a description thereof is thus omitted. It is to be understood that the parameters stored in the parameter buffer 704 are parameters with respect to the graph 700.

Functions specific to the graph 700 will now be described.

The graph 700 includes a plugin generating and holding unit 706. The graph 700 can include zero or more plugins. The user instructs the graph 700 to add or delete a plugin, thereby dynamically generating or deleting a plugin even during signal processing. The dynamic generation or deletion of a plugin during signal processing is described in detail below.

In the graph 700, the generated plugins are assigned identification numbers 0 to J, where J is any natural number, according to the order in which the plugins are added. The user identifies the plugins using the identification numbers. The graph 700 does not necessarily hold the plugins in the order of the identification numbers in the plugin generating and holding unit 706. The plugins are held by the plugin generating and holding unit 706 in the graph 700 in the form in which they are sorted in the order of the sequential calculations, described below.

The user can also instruct the graph 700 to connect the plugins included in the graph 700. The connection between an output port of a given plugin and an input port of another given plugin can be dynamically changed even during signal processing. The dynamic change is performed by the user specifying to the graph 700 the identification numbers of the plugins and the identification numbers of the ports. In response to an instruction from the user to change the connection, the graph 700 changes the connection state of the plugins.

The user instructs the graph 700 to initiate signal processing. When the user calls a signal-processing function of the graph 700, signal-processing functions of the plugins included in the graph 700 are successively called recursively from within the signal-processing function of the graph 700. When the signal-processing functions are called, the signal processors of the graph and plugins included in the graph 700, which are held by the plugin generating and holding unit 706 in the form in which they are sorted in the order of the sequential calculations, are successively enabled according to the order of sequential calculations. Calculations of the graph and plugins included in the graph 700 are sequentially performed, thereby realizing a complex signal processing operation of the overall circuit configured in the graph 700. The order of the sequential calculations is determined by the system (i.e., the graph 700) depending on the connection between the plugins.

In case of changing the circuit design according to a user instruction, such as adding or deleting a plugin or changing the connection between an input port and an output port, the graph 700 performs path routing, discussed below, to automatically determine the optimum order of sequential calculations for the plugins and child graph included in the graph 700. The optimum order of sequential calculations for the plugins included in the child graph is automatically determined by the child graph performing path routing.

As a result of the path routing performed by the graph 700, the plugin group (including the child graph as a plugin) is held in the plugin generating and holding unit 706 in the form in which the plugins are sorted in the optimum order of sequential calculations. A path routing algorithm of the graph 700 is described in detail below.

Functional Block Diagram of Graph

Figure 1:
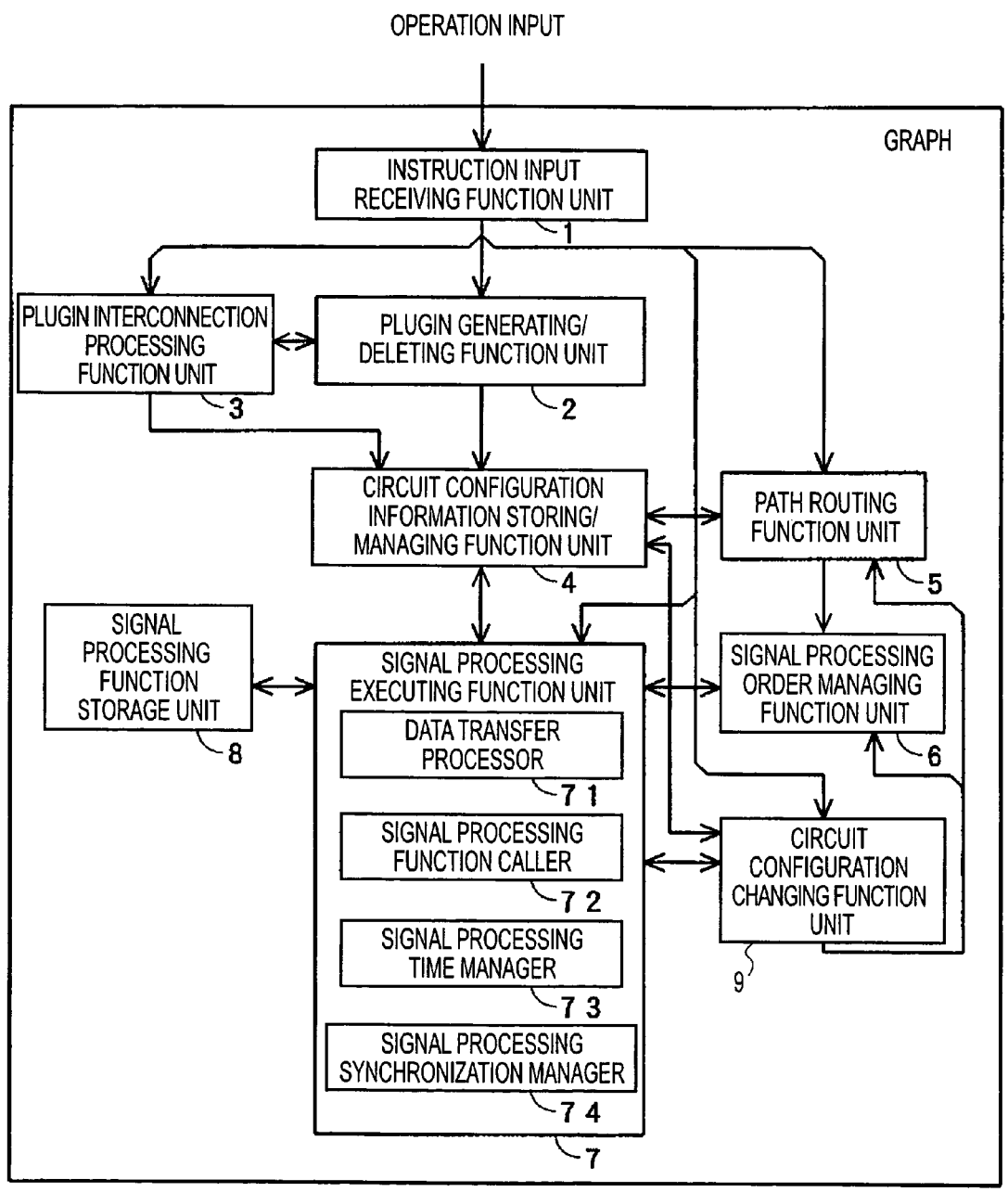
FIG. 1 is a functional block diagram of the main part of a signal processing apparatus according to an embodiment of the present invention.

FIG. 1 is a functional block diagram of a graph structure in which the functions of a graph are represented by blocks. The graph includes an instruction input receiving function unit 1, a plugin generating and deleting function unit 2, a plugin interconnection processing function unit 3, a circuit configuration information storing and managing function unit 4, a path routing function unit 5, a signal processing order managing function unit 6, a signal processing executing function unit 7, a signal processing function storage unit 8, and a circuit configuration changing function unit 9.

The instruction input receiving function unit 1 receives a user instruction to generate or delete a plugin, to connect an input port of a plugin and an output port of another plugin, to input a parameter, and so on. The instruction input receiving function unit 1 transfers a plugin generation or deletion instruction to the plugin generating and deleting function unit 2, and an input and output port connection instruction to the plugin interconnection processing function unit 3. In response to the plugin generation or deletion instruction or an input and output port connection instruction, the instruction input receiving function unit 1 activates the path routing function unit 5 to perform path routing. Further, in response to the parameter input instruction, the instruction input receiving function unit 1 is adapted to hold the input parameter in a parameter buffer.

The plugin generating and deleting function unit 2 generates or deletes a plugin in response to the plugin generation or deletion instruction from the instruction input receiving function unit 1. When a plugin is generated, the generated plugin is assigned an identification number, and information of the generated plugin including the identification number is transferred to the circuit configuration information storing and managing function unit 4. When a plugin is deleted, deletion information including the identification number of the deleted plugin and the deletion request is transferred to the circuit configuration information storing and managing function unit 4.

In response to a plugin interconnection instruction from the instruction input receiving function unit 1, the plugin interconnection processing function unit 3 transfers the connection information between the output port and the input port of the plugins specified by the connection instruction to the circuit configuration information storing and managing function unit 4.

The circuit configuration information storing and managing function unit 4 stores and manages information relating to the circuit configured in the graph from the plugin generation information, deletion information, or connection information from the plugin generating and deleting function unit 2 or the plugin interconnection processing function unit 3.

The path routing function unit 5 activates and executes a path routing algorithm, described below, in response to an activation request based on the plugin generation or deletion instruction or the input and output port connecting instruction from the instruction input receiving function unit 1. As a result of the path routing algorithm, the path routing function unit 5 determines an order of sequential calculations of the plugins (hereinafter referred to as a "signal processing order"), and sends information relating to the signal processing order to the signal processing order managing function unit 6.

As discussed above, the signal processing order managing function unit 6 arranges and holds the identification information of the plugins in the signal processing order in the plugin generating and holding unit.

As shown in FIG. 1, the signal processing executing function unit 7 includes a data transfer processor 71, a signal-processing function caller 72, a signal processing time manager 73, and a signal processing synchronization manager 74.

The signal processing executing function unit 7 initiates signal processing with the circuit configured in the graph in response to a signal processing initiation instruction input via the instruction input receiving function unit 1. When the user instructs that a signal-processing function of the graph be called, the signal-processing function caller 72 reads the instructed signal-processing function of the graph from the signal processing function storage unit 8. The signal-processing function caller 72 reads the signal-processing function of the graph in response to the user instruction, and signalprocessing functions of the plugins in the graph are successively called recursively from within the signal-processing function of the graph.

The data transfer processor 71 of the signal processing executing function unit 7 refers to the circuit information stored in the circuit configuration information storing and managing function unit 4, and sequentially transfers audio data to the plugins in processing data units (e.g., in units of one sample or in units of one packet) according to the circuit configuration.

The signal processing time manager 73 manages data-sample-based time scales from the data transfer processor 71. The signal processing synchronization manager 74 manages packet synchronization (e.g., a packet header) during packet-based signal processing, AV synchronization, described above, in which the processing time of audio data is synchronized with a frame of video data, and so on.

The circuit configuration changing function unit 9 detects a circuit-configuration change request based on a user operation via the instruction input receiving function unit 1 during the signal processing in the signal processing executing function unit 7. In response to a circuit-configuration change request, the circuit configuration changing function unit 9 writes new circuit configuration information in the circuit configuration information storing and managing function unit 4 to update the circuit configuration information to the new circuit configuration information, and activates the path routing function unit 5 and the signal processing order managing function 6 during a period from the end of the signal processing in a given processing data unit to the beginning of the signal in the subsequent processing data unit.

Even during signal processing by the signal processing executing function unit 7, in response to an activation request based on an instruction to change the circuit configuration in the graph from the circuit configuration changing function unit 9, a plugin generation or deletion instruction from the instruction input receiving unit 1, or an input/output port connection instruction, the path routing function unit 5 activates a path routing algorithm, described below, to perform path routing for the changed circuit configuration. The path routing function unit 5 transmits a path routing result to the circuit configuration information storing and managing function unit 4 and the signal processing order managing function 6. Thus, the signal processing executing function unit 7 performs signal processing with the changed circuit configuration in the signal processing order based on the path routing result for the changed circuit configuration.

In this embodiment, the circuit configuration changing function unit 9 detects, as a circuit-configuration change request, a plugin generation or deletion instruction or an input/output port connection instruction from the user via the instruction input receiving function unit 1 during the signal processing by the signal processing executing function unit 7. The circuit changing process executed in response to the circuit-configuration change request is described below.

Process for Forming a Circuit with Graph Structure

Figure 8:
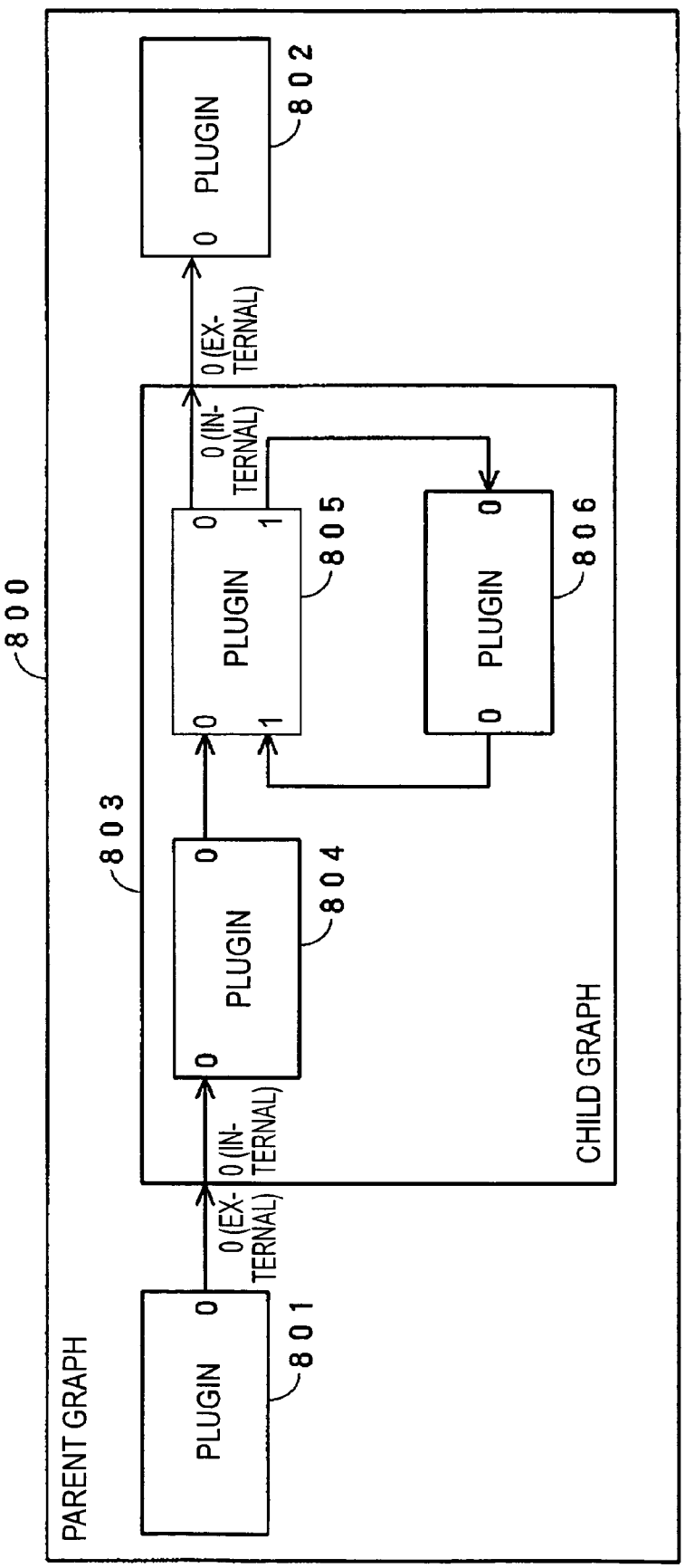
FIG. 8 is a diagram showing an exemplary circuit configuration of the signal processing apparatus according to the embodiment of the present invention.
Figure 9:
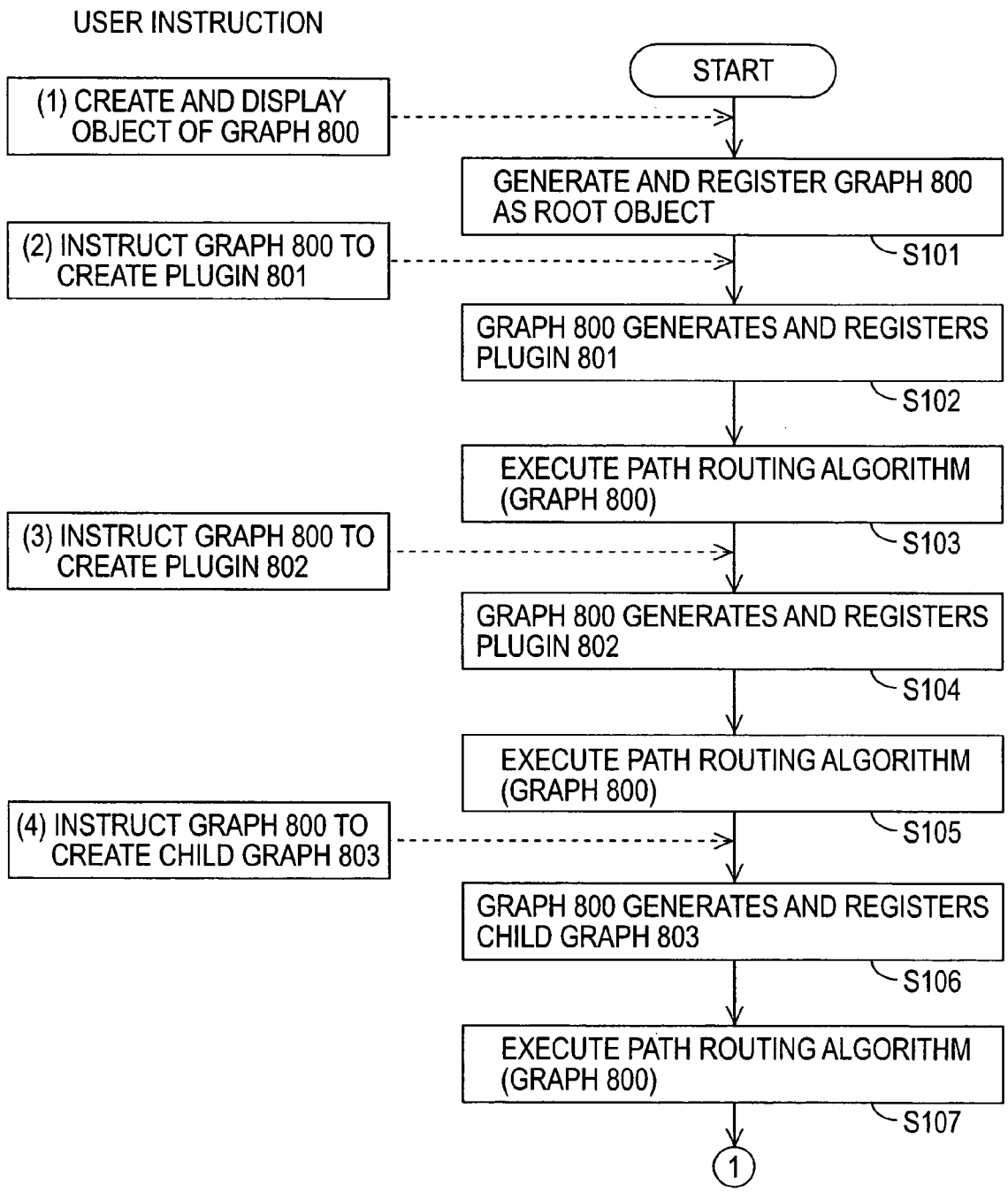
FIG. 9 is a flowchart showing an exemplary circuit forming process in the signal processing apparatus according to the embodiment of the present invention.
Figure 11:
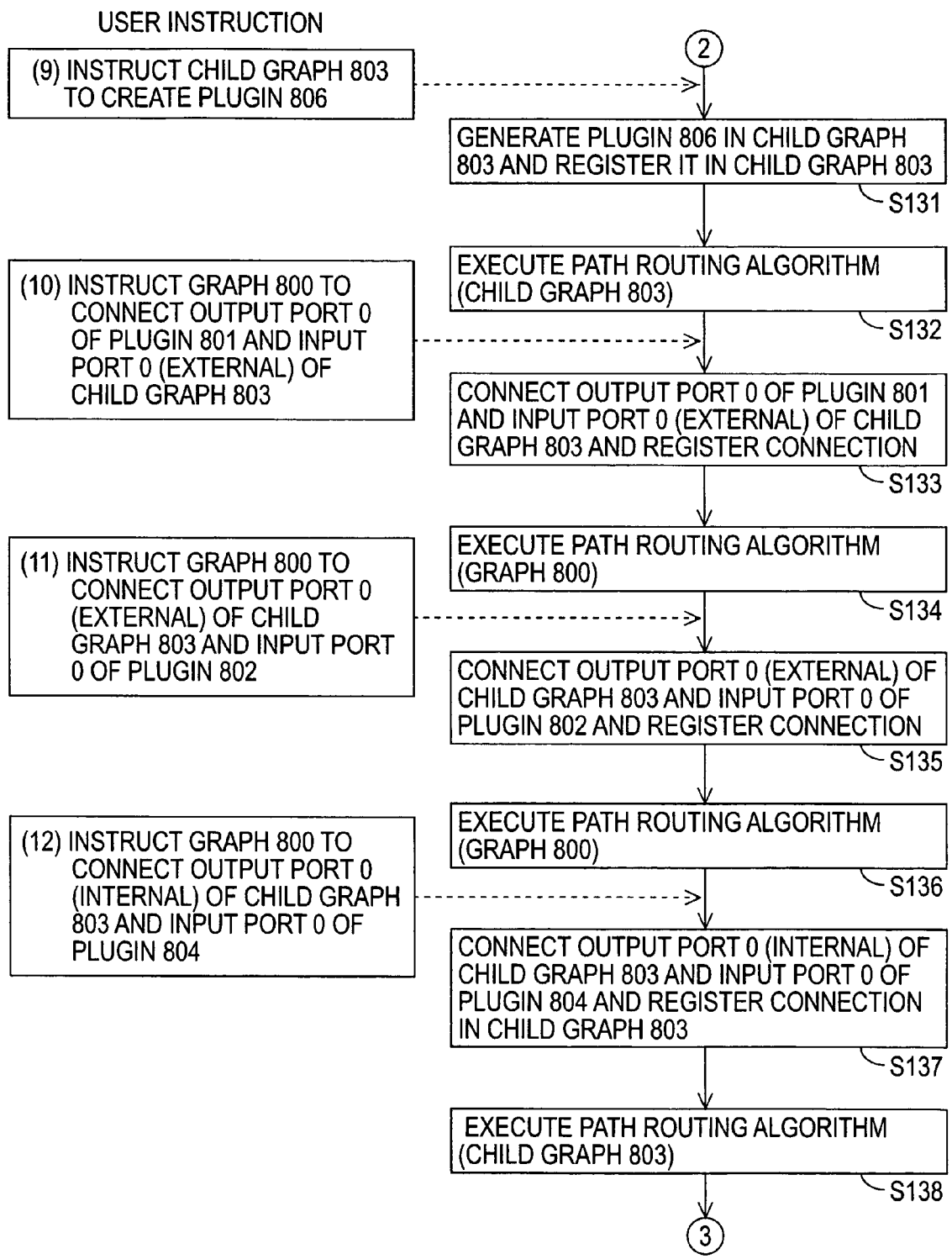
FIG. 11 is a flowchart showing the exemplary circuit forming process in the signal processing apparatus according to the embodiment of the present invention.
Figure 12:
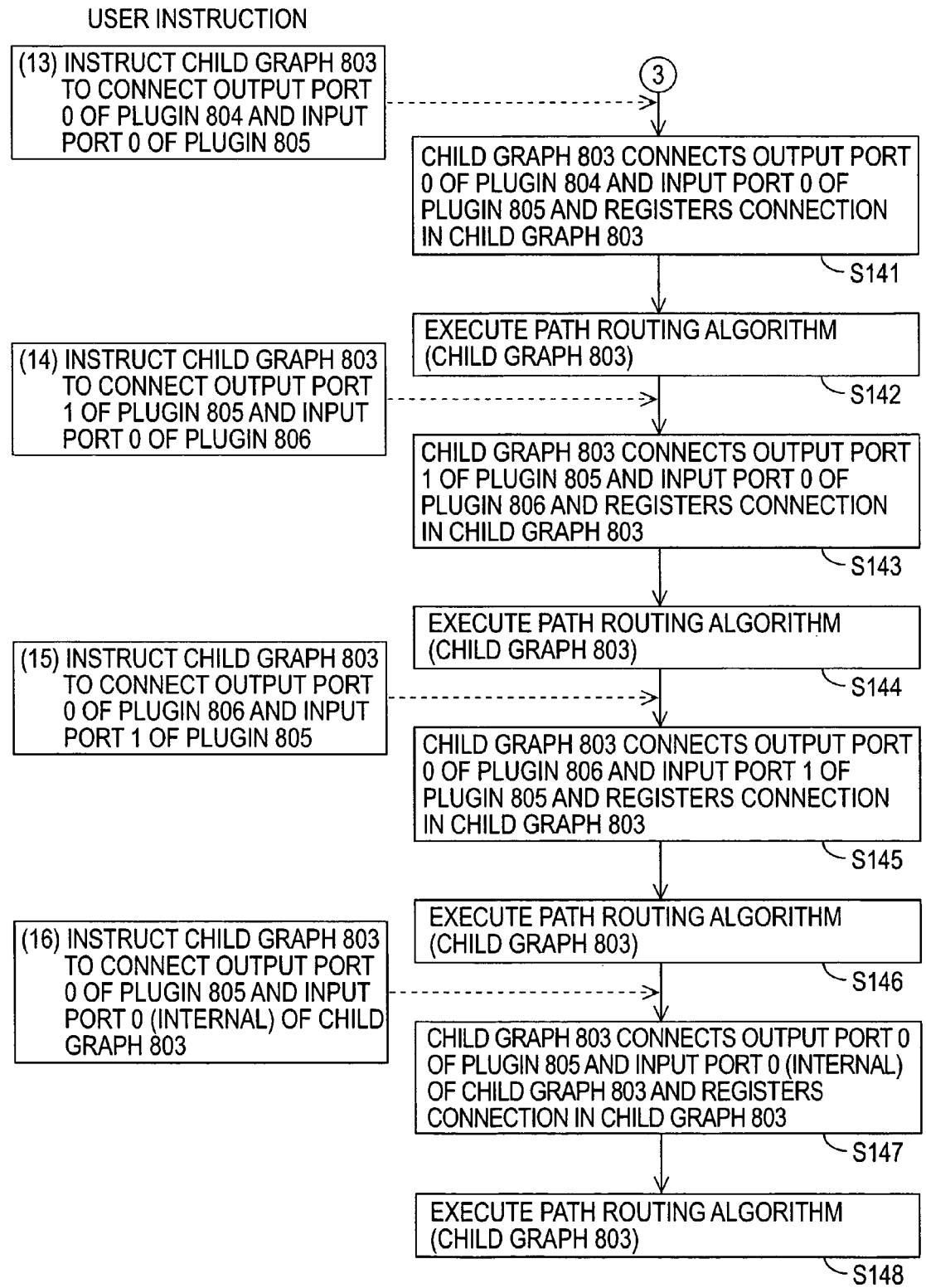
FIG. 12 is a flowchart showing the exemplary circuit forming process in the signal processing apparatus according to the embodiment of the present invention.

Next, the flow of forming a signal processing circuit according to an embodiment will be described in the context of a case where a circuit with the structure shown in FIG. 8 is formed in a graph. In the following description, graphs and plugins are generally referred to as "objects". In object-oriented terminology, an object is an instance, which is an entity of a graph or a plugin.

In generating objects, the number of input and output ports of each of the graphs and plugins is set as default (initial values) as below. The user may add or delete an input port and/or an output port after generating the objects.

For the parent graph 800, the number of input ports is 0, and the number of output ports is 0.

For the plugin 801, the number of input ports is 0, and the number of output ports is 1.

For the plugin 802, the number of input ports is 1, and the number of output ports is 0.

For the child graph 803, the number of input ports is 1, and the number of output ports is 1.

For the plugin 804, the number of input ports is 1, and the number of output ports is 1.

For the plugin 805, the number of input ports is 2, and the number of output ports is 2.

For the plugin 806, the number of input ports is 1, and the number of output ports is 1.

In the following description, the numbers following the input ports and the output ports represent port numbers, using 0, 1, and 2.

Circuit Creation Procedure

A procedure for creating the circuit shown in FIG. 8 will now be described with reference to a flowchart shown in FIGS. 9 to 12. In FIGS. 9 to 12, for ease of understanding, user instructions are illustrated in association with the operation of the signal processing apparatus of the embodiment. Although not shown, the signal processing apparatus of the embodiment provides views on a display screen in accordance with the instruction input by the user so that the user can perform the input operation while viewing the display screen.

First, the user instructs the signal processing apparatus to create an object of the graph 800 (parent graph) (user instruction (1)). Then, the signal processing apparatus generates the parent graph 800 as a root object, and registers it (step S101).

The user instructs the object of the graph 800 to create an object of the plugin 801 (user instruction (2)). Then, in the signal processing apparatus, the plugin generating and deleting function of the created graph 800 is exercised to generate the plugin 801 inside the graph 800 and to register it (step S102). In response to the plugin generation instruction, the path routing function unit in the graph 800 performs path routing (step S103).

The user instructs the object of the graph 800 to create an object of the plugin 802 (user instruction (3)). Then, in the signal processing apparatus, the plugin generating and deleting function of the graph 800 is exercised to generate the plugin 802 inside the graph 800 and to register it (step S104). In response to the plugin generation instruction, the path routing function unit in the graph 800 performs path routing (step S105).

The user instructs the object of the graph 800 to create an object of the graph 803 (child graph) (user instruction (4)). Then, the graph 800 exercises the plugin generating and deleting function to generate the child graph 803 inside the graph 800 as a plugin and to register it (step S106). In response to the plugin generation instruction, the path routing function unit in the graph 800 executes path routing (step S107).

The user instructs the object of the graph 803 to create input port 0 (external) (user instruction (5)). Then, in the signal processing apparatus, as a function of the generated child graph 803, the input port 0 (external) is generated and registered in the child graph 803 (step Sill). In the child graph 803, internal output port 0 (internal) corresponding to the input port 0 (external) is automatically generated (step S112). In response to the port creation instruction, the path routing function unit in the child graph 803 performs path routing (step S113).

The user instructs the object of the child graph 803 to create output port 0 (external) (user instruction (6)). Then, in the signal processing apparatus, as a function of the generated child graph 803, output port 0 (external) is generated and registered in the child graph 803 (step S114). In the child graph 803, internal input port 0 (internal) corresponding to the output port 0 (external) is automatically generated (step S115). In response to the port creation instruction, the path routing function unit in the child graph 803 performs path routing (step S116).

The user instructs the object of the child graph 803 to create an object of the plugin 804 (user instruction (7)). Then, the plugin generating and deleting function of the child graph 803 is exercised to generate the plugin 804 inside the child graph 803 and to register it (step S117). In response to the plugin generation instruction, the path routing function unit in the child graph 803 performs path routing (step S118).

The user instructs the object of the child graph 803 to create an object of the plugin 805 (user instruction (8)). Then, the plugin generating and deleting function of the child graph 803 is exercised to generate the plugin 805 inside the child graph 803 and to register it (step S119). In response to the plugin generation instruction, the path routing function unit in the child graph 803 performs path routing (step S120).

The user instructs the object of the child graph 803 to create an object of the plugin 806 (user instruction (9)). Then, the plugin generating and deleting function of the child graph 803 is exercised to generate the plugin 806 inside the child graph 803 and to register it (step S131). In response to the plugin generation instruction, the path routing function unit in the child graph 803 performs path routing (step S132).

The user instructs the object of the graph 800 to connect output port 0 of the plugin 801 and the input port 0 (external) of the child graph 803 (user instruction (10)). Then, the graph 800 exercises the plugin interconnection processing function unit to connect the output port 0 of the plugin 801 and the input port 0 (external) of the child graph 803 and to register the connection in the graph 800 (step S133). In response to the port connection instruction, the path routing function unit in the graph 800 performs path routing (step S134).

The user instructs the object of the graph 800 to connect the output port 0 (external) of the child graph 803 and input port 0 of the plugin 802 (user instruction (11)). Then, the graph 800 exercises the plugin interconnection processing function unit to connect the output port 0 (external) of the child graph 803 and the input port 0 of the plugin 802 and to register the connection in the graph 800 (step S135). In response to the port connection instruction, the path routing function unit in the graph 800 performs path routing (step S136).

The user instructs the object of the child graph 803 to connect the internal output port 0 (internal) of the child graph 803 and input port 0 of the plugin 804 (user instruction (12)). Then, the child graph 803 exercises the plugin interconnection processing function unit to connect the internal output port 0 (internal) of the child graph 803 and the input port 0 of the plugin 804 and to register the connection in the child graph 803 (step S137). In response to the port connection instruction, the path routing function unit in the child graph 803 performs path routing (step S138).

The user instructs the object of the child graph 803 to connect output port 0 of the plugin 804 and input port 0 of the plugin 805 (user instruction (13)). Then, the child graph 803 exercises the plugin interconnection processing function unit to connect the output port 0 of the plugin 804 and the input port 0 of the plugin 805 and to register the connection in the child graph 803 (step S141). In response to the port connection instruction, the path routing function unit in the child graph 803 performs path routing (step S142).

The user instructs the object of the child graph 803 to connect output port 1 of the plugin 805 and input port 0 of the plugin 806 (user instruction (14)). Then, the child graph 803 exercises the plugin interconnection processing function unit to connect the output port 1 of the plugin 805 and the input port 0 of the plugin 806 and to register the connection in the child graph 803 (step S143). In response to the port connection instruction, the path routing function unit in the child graph 803 performs path routing (step S144).

The user instructs the object of the child graph 803 to connect output port 0 of the plugin 806 and input port 1 of the plugin 805 (user instruction (15)). Then, the child graph 803 exercises the plugin interconnection processing function unit to connect the output port 0 of the plugin 806 and the input port 1 of the plugin 805 and to register the connection in the child graph 803 (step S145). In response to the port connection instruction, the path routing function unit in the child graph 803 performs path routing (step S146).

Finally, the user instructs the object of the child graph 803 to connect output port 0 of the plugin 805 and the internal input port 0 (internal) of the child graph 803 (user instruction (16)). Then, the child graph 803 exercises the plugin interconnection processing function unit to connect the output port 0 of the plugin 805 and the internal input port 0 (internal) of the child graph 803 and to register the connection in the child graph 803 (step S147). In response to the port connection instruction, the path routing function unit in the child graph 803 performs path routing (step S148).

The circuit shown in FIG. 8 is thus formed in the graph 800 according to the above-described procedure. When the user instructs the graph 800 to initiate signal processing, as discussed above, the plugins sequentially perform the signal processing according to the signal processing order determined by path routing.

As discussed above, in the signal processing apparatus of the embodiment, since the total of 16 user steps in the procedure described above are performed on the graph objects, the graph structure of the circuit is changed each time the steps are performed. Therefore, the path routing algorithm is automatically performed by the system (graph) for each step. When the circuit-configuration creation process ends, the path routing also ends, and the signal processing order is determined.

Next, the flow of performing signal processing on the formed circuit shown in FIG. 8 will be described.

The plugin generating and holding unit in the graph 800 holds plugins that are sorted in the optimum sequential calculation order determined by the path routing algorithm. While assuming that plugins are held in the optimum order, the flow of performing signal processing will now be described in the context of the example shown in FIG. 8.

(1) First, the user instructs the graph 800 to initiate signal processing.

(2) Then, the signal-processing function of the graph 800 is executed.

(3) Then, the signal-processing function of the plugin 801 is executed from within the signal-processing function of the graph 800.

(4) Then, the signal-processing function of the child graph 803 is executed from within the signal-processing function of the graph 800.

(4-1) Then, the signal-processing function of the plugin 806 is executed from within the signal-processing function of the child graph 803.

(4-2) Then, the signal-processing function of the plugin 804 is executed from within the signal-processing function of the child graph 803.

(4-3) Then, the signal-processing function of the plugin 805 is executed from within the signal-processing function of the child graph 803.

(5) Then, the signal-processing function of the plugin 802 is executed from within the signal-processing function of the graph 800.

In the procedure described above, only the processing of step (1) for instructing the graph 800 to initiate signal processing is performed in response to a user instruction, and the processing of steps (2) to (5) is automatically performed by the graph 800 and the child graph 803.

Within the signal-processing function of each plugin, the following operations are performed:

(1) receiving input data from the input port;
(2) performing signal processing on the input data; and
(3) outputting the signal-processed input data to the output port.

Path Routing Algorithm of Embodiment

Next, the path routing algorithm that is executed by the processing function of the graph according to this embodiment will be described.

The following path routing algorithm builds the main part of the system according to the embodiment. The path routing algorithm allows the plugins included in the graph to be sorted in the optimum order. During signal processing, the unique signal-processing functions of the plugins are sequentially called and executed in the order in which the plugins are sorted.

In general, when signal processing is performed using a signal processing device, such as a digital signal processor (DSP), an arithmetic circuit unit in the DSP, such as an arithmetic logical unit (ALU), sequentially performs calculations to achieve the desired signal processing. This sequential processing approach with the use of the DSP or the like is also applied to the arithmetic operation performed by a central processing unit (CPU) of the middleware according to this embodiment.

In this embodiment, a given circuit is regarded as a signal flow graph, the order of sequential calculations is determined from the graph, and calculations are sequentially performed in the determined order. The SSP, which is an implementation of the middleware according to this embodiment, has a unique path routing algorithm.

The path routing algorithm allows an arbitrary digital circuit configuration including a feedback loop to be completely emulated. The path routing algorithm also allows the circuit configuration to be dynamically changed, which is difficult in real-world hardware circuit environments.

The path routing algorithm according to this embodiment is an algorithm for determining the sequential calculation order from which plugin to start signal processing in order to carry out the signal processing on a circuit composed of plugins joined to define a graph. The circuit to be subjected to path routing, which is configured in the graph, may include a feedback-loop circuit configuration.

This path routing algorithm is contained in the graph, and the plugin generating and holding unit in the graph executes the path routing algorithm.

When the user instructs the graph to change the graph structure, the graph itself automatically performs path routing, and determines the new sequential calculation order. When a plurality of graphs are present inside a circuit, the path routing is independently performed for the individual graphs, and path routing is performed only on the changed graph. This path routing operation is simple enough to finish in a short period of time.

The details of the path routing algorithm according to this embodiment will be described hereinbelow.

In the path routing algorithm in this embodiment, plugins, which are circuit elements formed into a graph, are regarded as nodes. A node is an element forming a node in graph theory. In this embodiment, a circuit can be represented by a directed-edge graph including nodes joined by directional arrowed links. An arrow directed to a node is defined as an input to the node, and an arrow directed to the outside from a node is defined as an output from the node. In the path routing algorithm in this embodiment, the nodes joined to define a graph are traced forward to determine a signal order. The path routing algorithm in this embodiment is hereinafter referred to as a "node-scan algorithm".

The node-scan algorithm is made up of an initial path routing algorithm (primary node-scan algorithm) as a basic path routing algorithm, and a loop search algorithm for routing a path further according to loop information.

Figure 13:
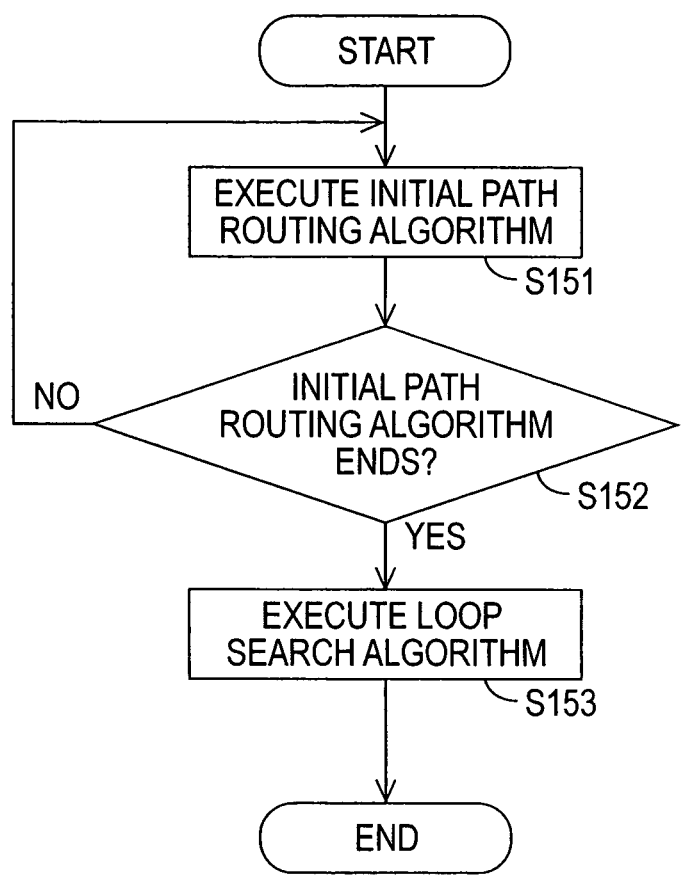
FIG. 13 is a flowchart showing a path routing algorithm in the signal processing apparatus according to the embodiment of the present invention.

In this embodiment, as shown in FIG. 13, in the node-scan algorithm, first, an initial path routing algorithm is executed (step S151). When the initial path routing algorithm ends (step S152), a loop search algorithm is executed (step S153).

Initial Path Routing Algorithm

The initial path routing algorithm is executed under the search conditions described below after setting the following propositional problem to be solved:

Propositional Problem to be Solved:

Assume that the nodes joined to define a graph are traced forward. Pass through all nodes at one time in one cycle under the conditions below. Determine the cyclic order that satisfies this requirement, where the nodes to be traced are not necessarily directly joined by graph edges and the nodes may be skipped and traced.

Search Conditions:

(a) The path can unconditionally pass through a node having no input.

(b) The path can unconditionally pass through a node of a plugin forming a delay element.

(c) An output of a passed node is defined.

(d) An input of a node A is defined once an output of a preceding node B connected to the input of the node A is defined.

(e) If all inputs of a given node are defined, then, the path can pass the given node.

The nodes are assigned in advance unique numbers as identifiers in order. These numbers are hereinafter referred to as "node numbers (node Nos.)". The node numbers may be arbitrary numbers, and, for example, node numbers may be assigned in the order in which the objects of the plugins are generated. There are two types of plugins, i.e., latency-type plugins (LTPs) and non-latency-type plugins (NLTPs). LTPs are plugins with a delay of one or more samples, forming delay elements. NLTPs are plugins without delay, forming gate elements.

Figure 14:
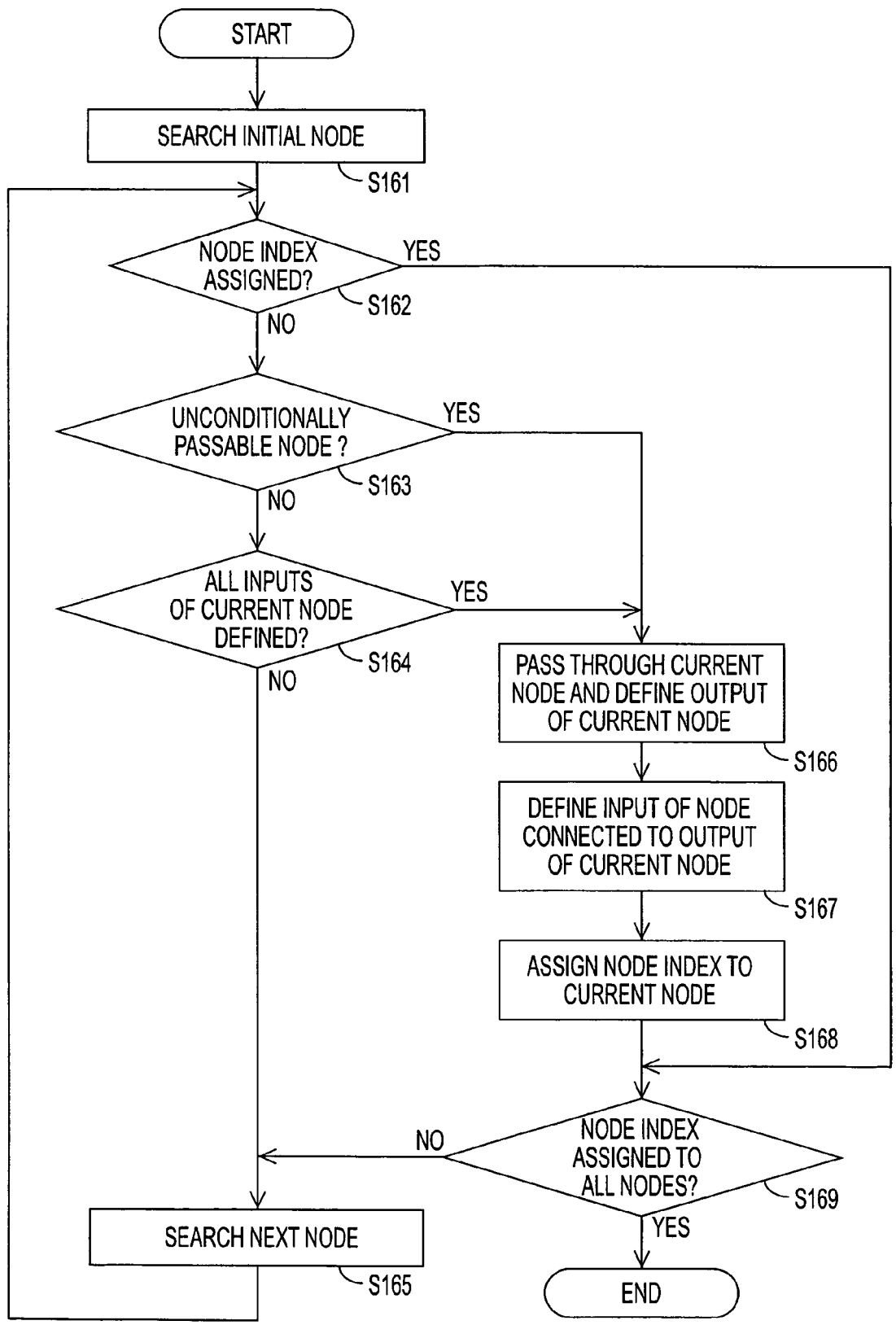
FIG. 14 is a flowchart showing an initial path routing algorithm forming a portion of the path routing algorithm in the signal processing apparatus according to the embodiment of the present invention.

The initial path routing algorithm described above can be executed according to a flowchart shown in FIG. 14.

First, the first node is checked (step S161), and it is determined whether or not the current node has a node sequence number (hereinafter referred to as a "node index") assigned (step S162). If the current node has a node index assigned, it is determined whether or not all nodes have node indexes assigned (step S172). If it is determined that all nodes have node indexes assigned, this processing routine ends.

If it is determined in step S172 that all nodes do not have node indexes assigned, the next node is checked (step S173). Then, the flow returns to step S162, and the processing after step S162 is repeatedly performed.

If it is determined in step S162 that the current node does not have a node index assigned, it is determined whether or not the current node is a node through which the path can unconditionally pass (hereinafter referred to as an "unconditionally passable node"), i.e., whether or not the current node is an LTP (step S163).

If it is determined in step S163 that the current node is not an unconditionally passable node, it is determined whether or not all inputs of the current node are defined (step S164). If it is determined in step S164 that all inputs are not defined, the next node is checked (step S165). Then, the flow returns to step S162, and the processing after step S162 is repeatedly performed.

If it is determined in step S163 that the current node is an unconditionally passable node or if it is determined in step S164 that all inputs of the current node are defined, the path passes through the current node, and the output of the current node is defined (step S166). Then, the input of the node to which the current node is connected is defined (step S167). The current node is then assigned a node index (step S168).

It is determined whether or not all nodes have node indexes assigned (step S169). If it is determined that all nodes have node indexes assigned, this processing routine ends.

Figure 15:
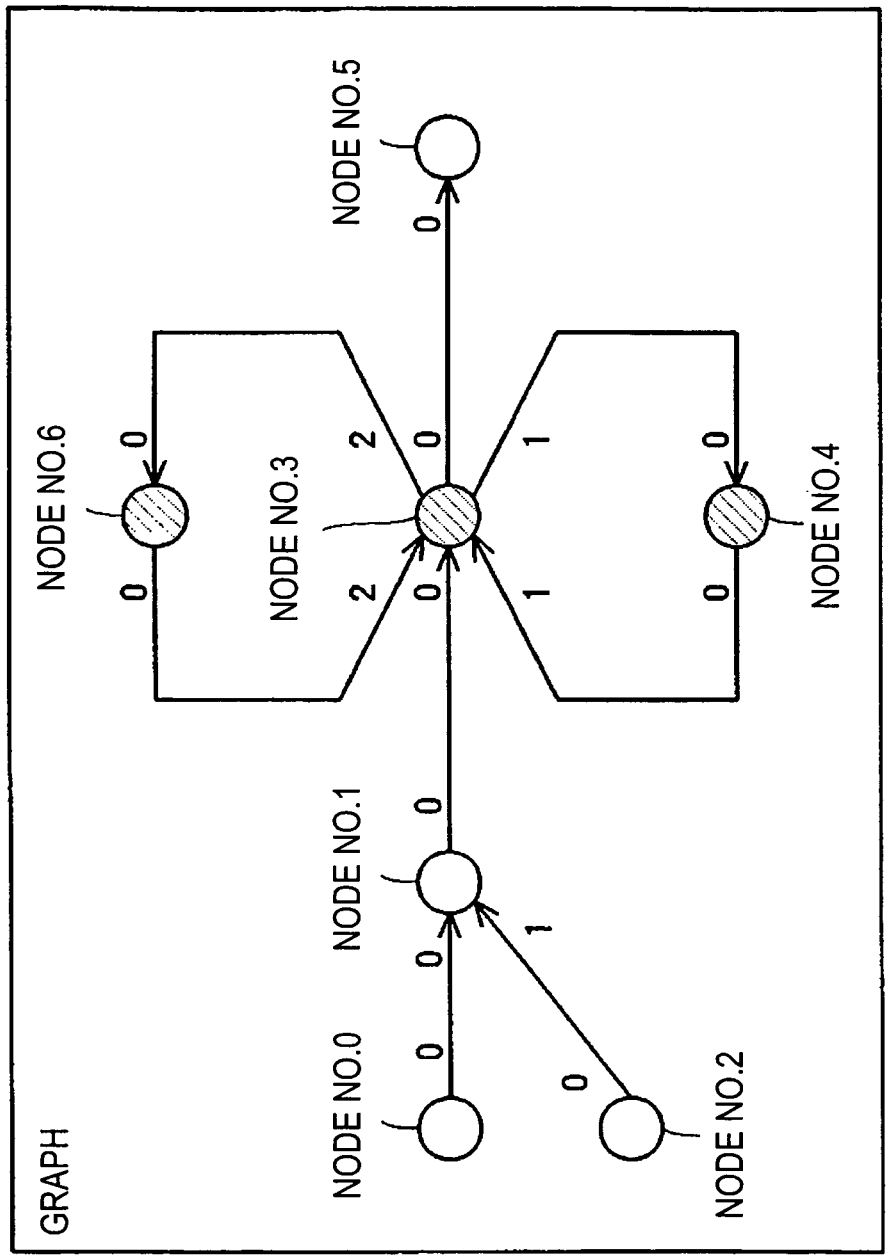
FIG. 15 is a diagram showing the initial path routing algorithm forming the portion of the path routing algorithm in the signal processing apparatus according to the embodiment of the present invention.

A specific example of the assignment of node indexes according to the initial path routing algorithm will be described in the context of a circuit configuration of a flag shown in FIG. 15. In FIG. 15, seven nodes, i.e., nodes No. 0 to No. 6, are target nodes. Nodes No. 4 and No. 6 are LTPs. In the initial path routing algorithm, nodes No. 0 to No. 6 are checked in turn as below. This check is repeatedly performed in multiple cycles, each cycle ranging from nodes No. 0 to No. 6, until all nodes become passable.

(1) Node No. 0 has no input and is therefore passable. The output (0) of node No. 0 is thus defined.

(2) Node No. 1 is skipped because the input (1) is undefined.

(3) Node No. 2 has no input and is therefore passable. The output (0) of node No. 2 is thus defined.

(4) Node No. 3 is skipped because all inputs (0, 1, and 2) are undefined.

(5) Node No. 4 is an LTP and is therefore passable. The output (0) of node No. 4 is thus defined.

(6) Node No. 5 is skipped because the input (0) is undefined.

(7) Node No. 6 is an LTP and is therefore passable. The output (0) of node No. 6 is thus defined.

The first cycle of path routing is thus completed. Then, the second cycle of path routing is performed as below on the nodes through which the path does not pass and of which outputs are undefined.

(1) Node No. 1 becomes passable because all inputs (0 and 1) are defined. The output (0) of node No. 1 is thus defined.

(2) Node No. 3 becomes passable because all inputs (0, 1, and 2) are defined. The outputs (0, 1, and 2) of node No. 3 are thus defined.

(3) Node No. 5 becomes passable because the input (0) is defined. Node No. 5 is thus defined.

Since the path passes through all nodes and the output is defined, the path routing operation is completed. In this case, routing is completed in the second cycle.

Routing Result of Initial Path Routing Algorithm

In the routing steps of the initial path routing algorithm, the nodes are numbered in the order in which the outputs are defined, and a routing result is determined. These new sequence numbers of the nodes are node indexes. FIG. 16 shows a routing result for the exemplary circuit configuration of the graph shown in FIG. 15.

In the graph, the plugins are stored in the plugin creating and holding unit in the order of the node indexes. Each time the path routing algorithm is executed, the order of the plugins stored in the plugin creating and holding unit is updated. During signal processing, the graph calls the signal-processing functions of the plugins in the order of the node indexes, thereby achieving the desired signal processing.

As discussed above, the initial path routing algorithm is repeatedly performed in the second cycle, the third cycle, and so on to check the nodes until the solution of the propositional problem is found. In a cycle of routing, at least one passable node is found.

However, there is an exception. That is, in a cycle of routing, no passable node is found if an LTP forming a delay element is not included in a feedback loop. This is abnormal in the circuit configuration.

In the general theory of digital signal processing, it is necessary to include at least one or more delay elements in a feedback loop to satisfy the principle of causality. In the initial path routing algorithm according to this embodiment, the exception occurs when a user creates a circuit that does not satisfy this basic principle.

In the initial path routing algorithm in this embodiment, the occurrence of the exception is used to warn the user of an error. When a user creates a feedback circuit including no delay element, the above-described exception of routing occurs in the initial path routing algorithm. When this exception is detected, the system warns the user so that he/she should reconfigure a circuit.

Loop Search Algorithm

Next, the loop search algorithm will be described. The loop search algorithm provides an improvement of a load on the CPU during signal processing. This technique is important to maintain high real-time signal processing.

A desired signal processing circuit is achievable by using a routing result determined in the initial path routing algorithm. However, the routing result determined in the initial path routing algorithm is not necessarily advantageous for a circuit configuration including a feedback loop in view of the speed and performance.

A circuit configuration including a feedback loop should satisfy the causality constraint in the theory of digital signal processing that outputs cannot be defined unless inputs are defined. In a circuit including a feedback loop, therefore, it is necessary to sequentially perform signal processing on the plugins in units of one sample. That is, it is necessary to perform an audio data input/output operation and signal processing on the plugins in units of one sample.

A problem is the number of function calls needed each time the signal processing is performed. In general, in software processing, a function call leads to an increase in the load on the CPU (and is thus costly). In software-based real-time signal processing, the fewer the function calls, the higher the processing speed and performance. A method for reducing the number of function calls may be needed for an improvement of the processing speed and performance.

A typical method for reducing the number of function calls is to perform processing in units of a plurality of data samples, e.g., in units of packets. Instead of processing in units of one sample, a block including a predetermined number of data samples is processed in a batch. For example, when the packet size is 1,024 samples, a block of 1,024 samples of audio data is processed by a single function call. Thus, the number of function calls can be reduced.

However, if a circuit includes a feedback loop, as discussed above, a function call may be needed in units of one sample. In this case, packet-based processing is not carried out.

In the path routing algorithm in this embodiment, this problem is overcome by performing the loop search algorithm, described below, after performing the initial path routing algorithm.

In a circuit including a feedback loop, nodes forming the loop are generally parts of the circuit. The loop search algorithm in this embodiment uses this fact to separate a group of nodes forming the loop (hereinafter referred to as "loop nodes") and a group of nodes not forming the loop (hereinafter referred to as "non-loop nodes") with respect to the signal processing order, and enables packet-based processing for the group of non-loop nodes, thereby entirely increasing the signal processing speed.

For example, in the circuit configuration shown in FIG. 15, three nodes, i.e., nodes No. 3, No. 4, and No. 6, are loop nodes, and are less than half of the total of seven nodes.

Only the loop nodes are processed in units of one sample, while the remaining nodes are processed in units of packets, to thereby prevent the deterioration in speed as much as possible. In the overall circuit configuration, the smaller the ratio of the loop nodes, the more efficiently the deterioration in speed can be prevented.

Figure 17:
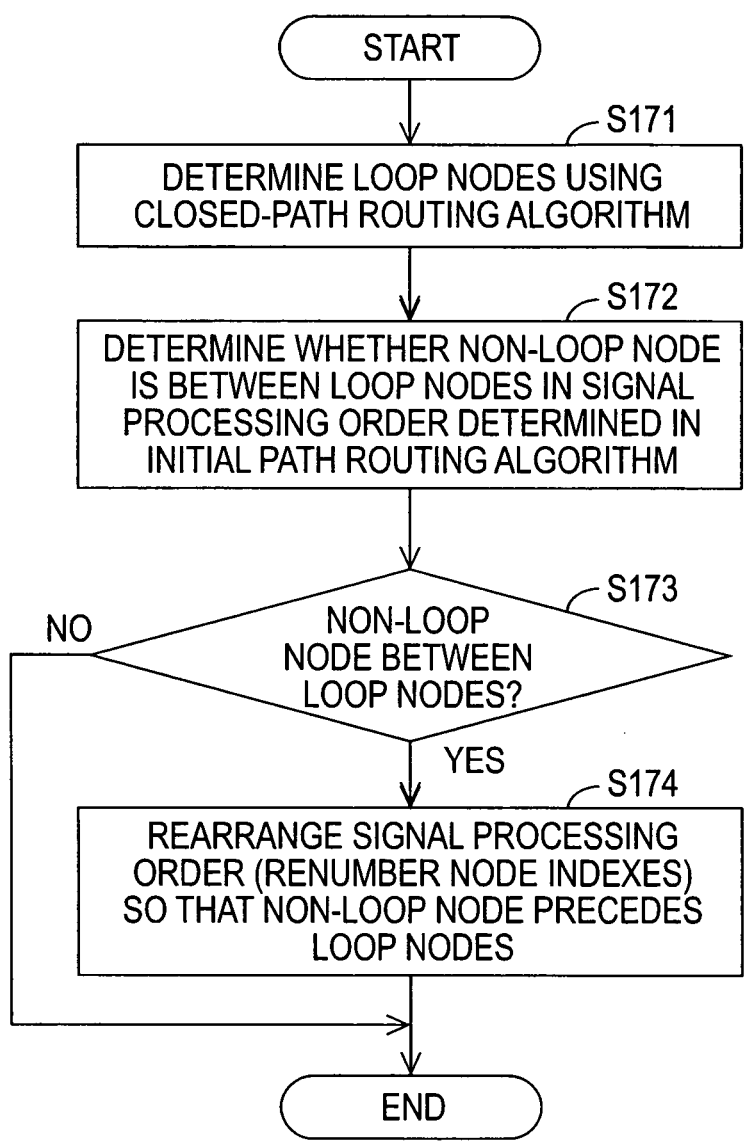
FIG. 17 is a flowchart showing a loop search algorithm forming a portion of the path routing algorithm in the signal processing apparatus according to the embodiment of the present invention.

FIG. 17 is a flowchart showing the loop search algorithm. First, a closed-path routing algorithm is used to determine loop nodes (step S171). The closed-path routing algorithm may employ a closed-path routing algorithm in general graph theory. The closed-path routing algorithm in general graph theory is known, and a detailed description thereof is thus omitted.

The signal processing order determined in the initial path routing algorithm is checked to determine whether or not a non-loop node is located between loop nodes in the signal processing order (step S172).

If it is determined that a non-loop node is located between loop nodes in the signal processing order (step S173), the signal processing order is rearranged so that the non-loop node precedes the loop nodes (step S174). That is, the node indexes are renumbered.

If it is determined in step S173 that no non-loop node is located between loop nodes in the signal processing order, the loop search algorithm ends.

The loop search algorithm will be specifically described hereinafter in the context of the application to the circuit configuration shown in FIG. 15.

A result of the initial path routing algorithm executed for the circuit configuration shown in FIG. 15 is shown in FIG. 16. A table viewed in the left portion of FIG. 18 shows that the loop nodes determined by the closed-path routing algorithm, i.e., nodes No. 3, No. 4, and No. 6, are shaded in the routing result shown in FIG. 16.

Figure 18:
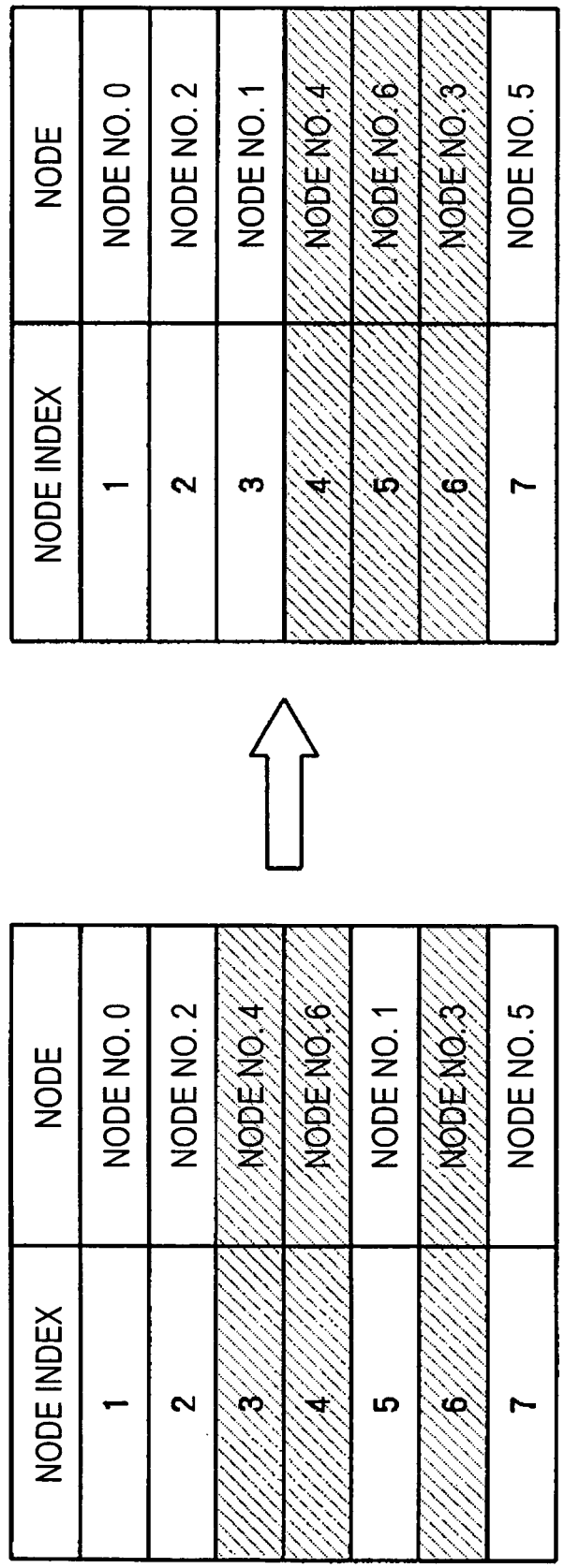
FIG. 18 is a diagram showing the loop search algorithm forming the portion of the path routing algorithm in the signal processing apparatus according to the embodiment of the present invention.

In the routing result of the initial path routing algorithm, as is apparent from the table viewed in the left portion of FIG. 18, node No. 1, which is a non-loop node, is located between loop nodes in the signal processing order. According to this signal processing order, node No. 1 is also subjected to processing in units of one sample although it does not need to be subjected to processing in units of one sample.

When applying the loop search algorithm, in step S174, the signal processing order is changed so that the non-loop node precedes the loop nodes.

If the signal processing order is changed, the propositional problem to be solved in the initial path routing algorithm should still be satisfied. In the loop search algorithm, when the signal processing order is changed, it may be determined whether or not the propositional problem to be solved in the initial path routing algorithm is satisfied for the changed signal processing order. In this example, the signal processing order is changed so that the non-loop node precedes the first loop node, whereby the above-described determination is not needed. This changing approach is advantageous in that the sequence of the signal processing is correctly maintained.

In the context of the example shown in FIG. 15, since nodes No. 4 and No. 6 are LTPs, inherently, the outputs are defined if the inputs are undefined. This inherent feature permits nodes No. 4 and No. 6 to be processed after node No. 1.

In this example, the loop search algorithm allows, as viewed in the right portion of FIG. 18, the signal processing order to be changed so that node No. 1, which is a non-loop node, is moved to the third position in the signal processing order, before node No. 4, which is the first loop node.

As indicated by shading in the right portion of FIG. 18, the loop nodes are grouped. That is, the group of loop nodes is localized in the signal processing order.

Signal processing is performed in the signal processing order viewed in the right portion of FIG. 18 according to the following procedure, thereby minimizing the number of function calls:

(1) The nodes with node indexes 1 to 3 are outside the loop, and are therefore processed in units of packets.

(2) The nodes with node indexes 4 to 6 reside in the loop, and are therefore processed in units of one sample.

(3) The node with node index 7 is outside the loop, and is therefore processed in units of packets.

By performing signal processing in this way, the number of function calls is reduced, thus preventing the deterioration in signal processing speed. Next, the number of function calls in a case where the packet size is 1,024 samples is as follows:

(1) 1,024 samples of data are transferred to node No. 0 for processing (by one function call).

(2) 1,024 samples of data are transferred to node No. 2 for processing (by one function call).

(3) 1,024 samples of data are transferred to node No. 1 for processing (by one function call).

(4) The following operations (4-1) to (4-3) are repeatedly performed 1,024 times (by 3×1,024 function calls).

(4-1) One sample of data is transferred to node No. 4 for processing (by one function call).

(4-2) One sample of data is transferred to node No. 6 for processing (by one function call).

(4-3) One sample of data is transferred to node No. 3 for processing (by one function call).

(5) 1,024 samples of data are transferred to node No. 5 for processing (by one function call).

In the signal processing steps (1) to (5) described above, a total of 3,076 function calls are executed to perform signal processing on 1,024 samples.

In this example, if all nodes are processed in units of one sample, a total of 7,168 function calls are executed. The node-scan algorithm in the embodiment is executed to localize a group of loop nodes, and one function call for every sample is executed for each of the group of loop nodes while one function call for every packet is executed for each of the remaining non-loop nodes. Thus, the number of function calls can be reduced by about 57%.

In the system of this embodiment, instead of using a fixed packet size, the packet size can be dynamically changed.

AV Synchronization

As discussed above, the signal processing apparatus according to this embodiment allows sample-accuracy calculation. The signal processing apparatus further allows sample-accuracy AV synchronization. In traditional middleware, a plurality of plugins that are connected in multiple stages causes a delay in proportion to the number of connected plugins, and it is difficult to synchronously process all plugins.

According to this embodiment, in contrast, there is no increase in delay whatsoever plugins are connected. Thus, the plugins are allowed to synchronously operate with sample accuracy, and sample-accuracy AV synchronization is achieved.

For the purpose of AV synchronization, in this embodiment, a V synchronization flag is additionally supplied as vertical synchronization information Vs of video data from the system (graph) in the form in which the V synchronization flag is attached to the time information. Since the time information is updated on a sample-by-sample basis, the V synchronization flag is attached for all samples. For example, the V synchronization flag is set to "1" at the time of the beginning of each frame, and is set to "0" otherwise.

The V synchronization flag represents synchronization pulse information for associating a frame of video with a sample of audio data. For example, in the case of video information with 30 frames per second and audio data with a sampling frequency of 48 kHz, the number of samples of the audio data per frame of the video information is given by 48000÷30=1600 (samples per frame). In the case of processing the audio data in units of packets, for example, as described above, when the number of samples per packet is 1024, the numbers of packets and frames are not equal. In this example, the V synchronization flag is used to realize AV synchronization.

The system (graph) predetermines the number of audio data samples per frame of video information. The system (graph) transfers the audio data to a plugin, and also transfers sample time information of the audio data and the V synchronization flag as information as to whether or not the sample time is at the beginning of the video frame to the plugin.

When the V synchronization flag indicates that the input audio data corresponds to the beginning of a frame of the video information, each plugin changes the parameter held in the plugin in synchronization with the beginning of the video frame to realize AV synchronization.

However, it is promised that the time information for each sample from the system (graph) be associated with V synchronization flags of the video frames by a certain method. In this example, the signal processing apparatus of this embodiment defines a starting time point of signal processing as the beginning of a video frame, and associates the time information after the starting time point with a V synchronization flag by using the number of audio data samples per frame of video information that is predetermined by the system (graph).

Figure 19:
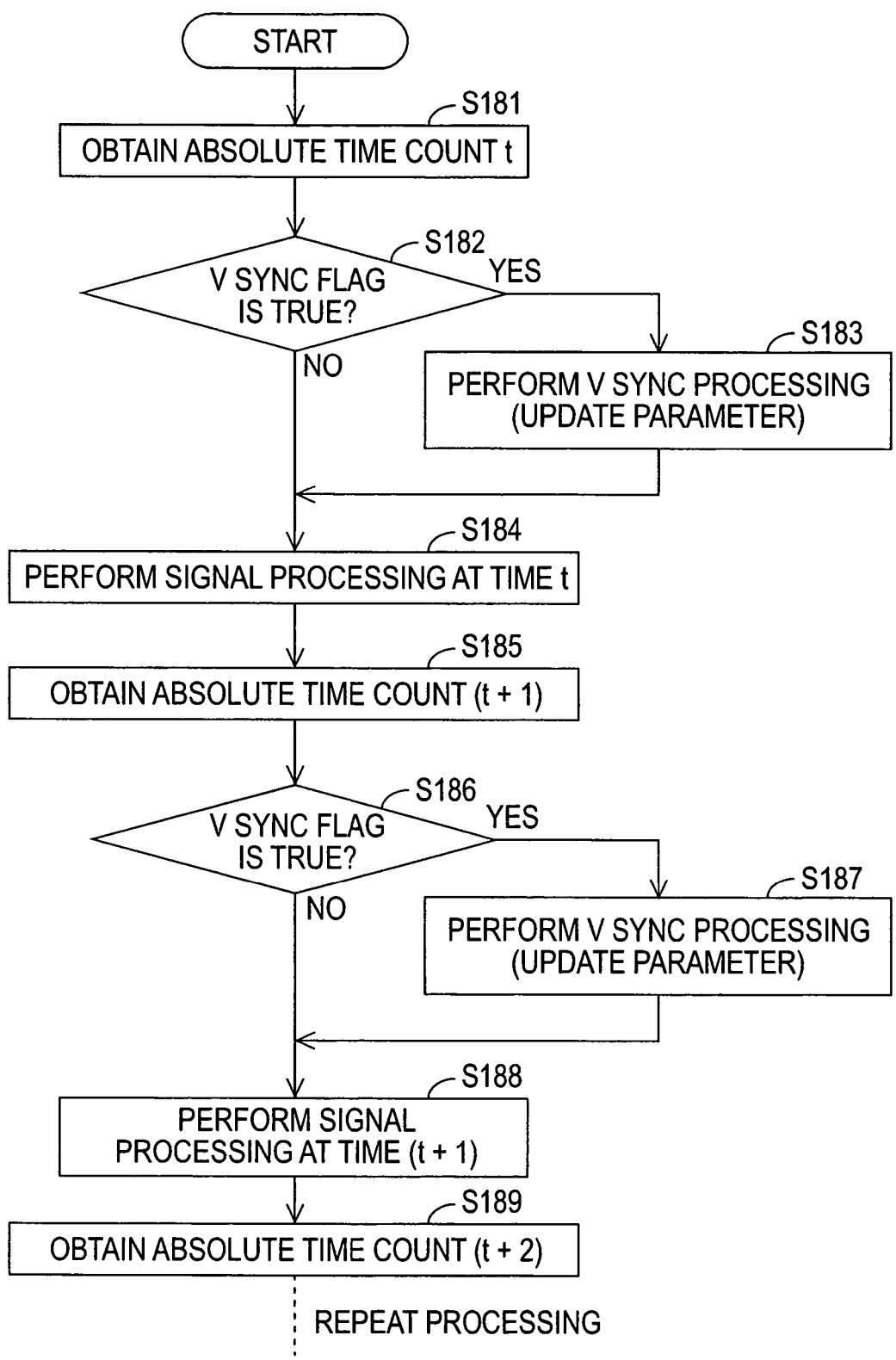
FIG. 19 is a flowchart showing an AV synchronization process in the signal processing apparatus according to the embodiment of the present invention.

FIG. 19 is a flowchart showing a process in a plugin for achieving AV synchronization.

First, in synchronization with the input of an audio data sample to a plugin, an absolute time count value t is obtained as time information input to the plugin from the system (graph) (step S181). That is, time information for each sample is read from the system. The V synchronization flag attached to the time information is also obtained from the system.

The plugin determines whether or not the V synchronization flag for each sample is "1" to determine whether or not the V synchronization flag is "true", i.e., whether or not the flag indicates the beginning of the video frame (step S182). If it is determined that the V synchronization flag is "true", AV synchronization processing is performed. In this example, the parameter is updated (step S183). Then, signal processing at time t is performed (step S184).

If it is determined in step S182 that the V synchronization flag is not "true", the signal processing at time t is performed without changing the parameter (step S184).

Then, the next absolute time count value (t+1) to be changed in synchronization with the input of the next audio data sample to the plugin is obtained (step S185), and the processing operation similar to the processing of steps S182 to S184 described above is repeatedly performed (steps S186 to S188). In synchronization with the following sample inputs, the processing described above is repeatedly performed.

First Dynamic Circuit-Configuration Changing Process

As discussed above, the signal processing apparatus of this embodiment is capable of dynamically changing the graph structure even during signal processing in response to a graph changing instruction (circuit-configuration changing instruction) from a user. Even during signal processing, the path routing algorithm (node-scan algorithm) in this embodiment is re-executed to support the change of the circuit configuration.

The circuit-configuration changing process is performed during a period from the end of the process for a signal in a processing data unit to the beginning of a signal in the subsequent processing data unit, thereby starting the signal processing with the changed circuit configuration from the beginning of the processing data unit, rather than in the middle of the processing data unit. A problem caused by changing the circuit configuration is therefore prevented.

This arrangement allows a user to change the signal processing apparatus of this embodiment to a new circuit configuration while, for example, listening to the sound processed and output from the signal processing apparatus of this embodiment. It is therefore effective to apply the signal processing apparatus of this embodiment to equipment for live performance applications.

Figure 20:
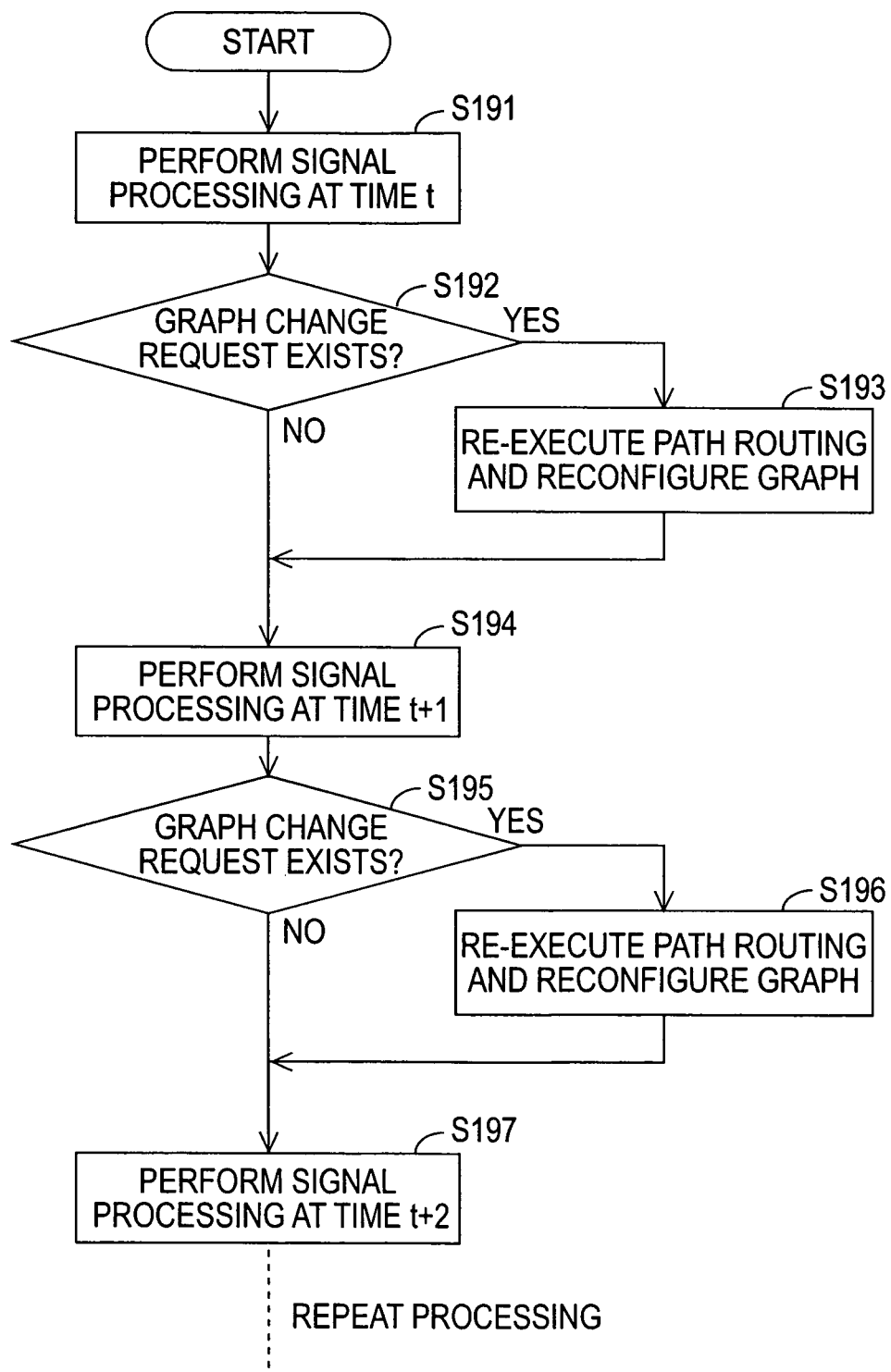
FIG. 20 is a flowchart showing a dynamic circuit-configuration changing process in the signal processing apparatus according to the embodiment of the present invention.
Figure 21:
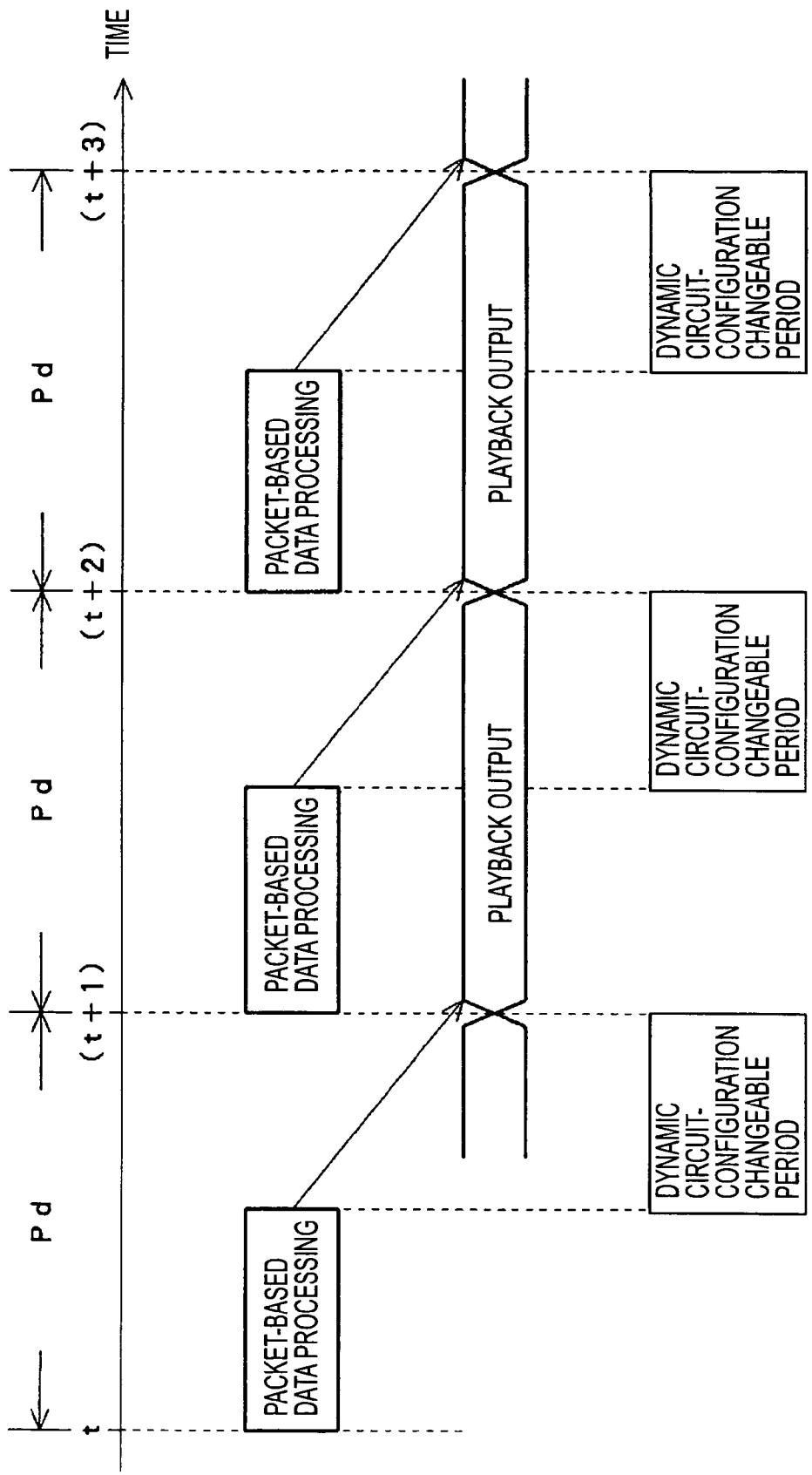
FIG. 21 is a diagram showing an exemplary change of the circuit configuration of the signal processing apparatus according to the embodiment of the present invention.

FIG. 20 is a flowchart showing the dynamic circuit-configuration changing process. This flowchart is executed by a graph. FIG. 21 is a timing chart of the process. In this embodiment, for example, digital audio data with a sampling frequency of 48 kHz is processed in units of packets, each packet including, e.g., 1,024 samples. In FIG. 21, time t, t+1, t+2, t+3, . . . is set at intervals of 1,024 samples, and the period of time Pd between the time t+i and the next time t+(i+1) is, e.g., 20 milliseconds, where i is an integer.

In the signal processing apparatus, the processing of digital audio data in units of packets is finished in a shorter period of time than the period of time Pd using a high-speed clock. In a loop-forming section of the circuit configuration, packets are disassembled and the signal processing is performed on a sample-by-sample basis, in which case the signal processing is also finished in a shorter period of time than the period of time Pd.

The data in the packet unit after the signal processing is written in a buffer memory composed of, for example, a first-in first-out (FIFO) memory. In general, as shown in FIG. 21, the data is played back after the end of the signal processing in this packet unit, starting from the start time of the processing in the subsequent packet unit. The audio data in units of packets is thus continuously played back.

The processing of digital audio data in units of packets is finished in a shorter period of time than the period of time Pd. As is apparent from FIG. 21, the period from the end of the data processing in a given packet unit to the beginning of data in the subsequent packet unit is a signal-processing idle period. In this embodiment, the idle period is used as a dynamic circuit-configuration changeable period.

The circuit configuration is dynamically changed during the period from the end of the data processing in a given packet unit to the beginning of data in the subsequent packet unit, and the processing with the changed circuit configuration is started from the data at the beginning of the subsequent packet. That is, the circuit configuration is not changed in the middle of packets, and the problem discussed previously does not occur.

First, signal processing at time t is performed (step S191). Specifically, the signal processing executing function unit 7 executes data processing in units of packets using the circuit configuration information stored in the circuit configuration information storing and managing function unit 4 according to the signal processing order held by the signal processing order managing function unit 6.

After performing the data processing in units of packets, in the dynamic circuit-configuration changeable period, even during signal processing, in this embodiment, the circuit configuration changing function unit 9 determines whether or not a graph change request (circuit-configuration change request) exists by determining whether or not an instruction to generate or delete a plugin, an instruction to generate or connect an input port and an output port, or the like has been issued to the graph via the instruction input receiving function unit 1 (step S192).

If it is determined in step S192 that a graph change request exists, the graph holds new circuit configuration information in the circuit configuration information storing and managing function unit 4, and re-executes path routing to reconfigure a circuit configuration of the graph (step S193). The information of the new signal processing order, which is a path routing result, is held in the signal processing order managing function unit 6.

Then, signal processing at next time (t+1) is performed (step S194). A packet at the time (t+1) is subjected to signal processing with the new circuit configuration, starting from the data at the beginning of the packet.

If it is determined in step S192 that no graph change request exists, then, signal processing at the time (t+1) is performed without dynamically changing the circuit configuration (step S194).

After step S194, processing similar to the processing of steps S192 to S193 is repeatedly performed (e.g., steps S195 to S196).

Figure 22:
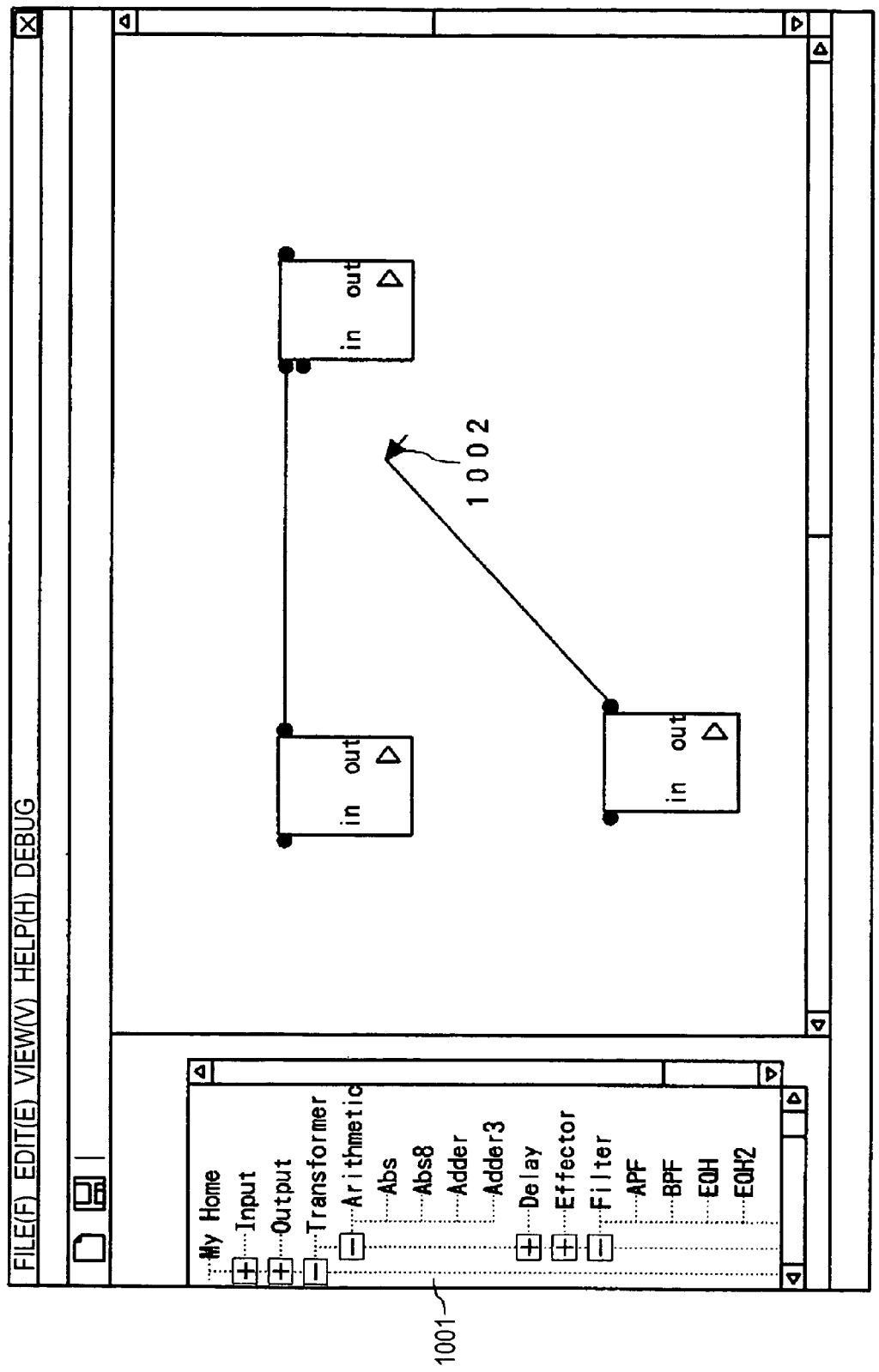
FIG. 22 is a diagram showing an exemplary change of the circuit configuration of the signal processing apparatus according to the embodiment of the present invention.

FIG. 22 illustrates an exemplary circuit-configuration changing instruction. In the example shown in FIG. 22, the graph and plugins described above are visually displayed in the form of, e.g., blocks on a GUI screen of a PC or the like, and a connection between the blocks is instructed using a pointing device, such as a mouse.

In FIG. 22, a list of candidate plugins 1001 is displayed in the left side of the GUI screen. For example, the user selects a desired plugin from the list 1001 to add a plugin. The selected plugin is displayed on the GUI screen.

Then, the user connects the plugins. Specifically, the user places a cursor 1002 at the output end of the plugin to be connected, and drags and moves the cursor 1002 toward the input end of the plugin at the other end of the connection. As a result, a segment of the connection is displayed in the manner shown in FIG. 22.

When the user drags and drops (or releases) the cursor 1002 on the input end of the plugin at the other end of the connection, the connection between the plugins is established. By moving the cursor 1002 to the input end or the output end of a plugin and clicking the mouse, the connection is displayed in gray or as a dotted line, and is deleted by setting it.

Figure 23A:
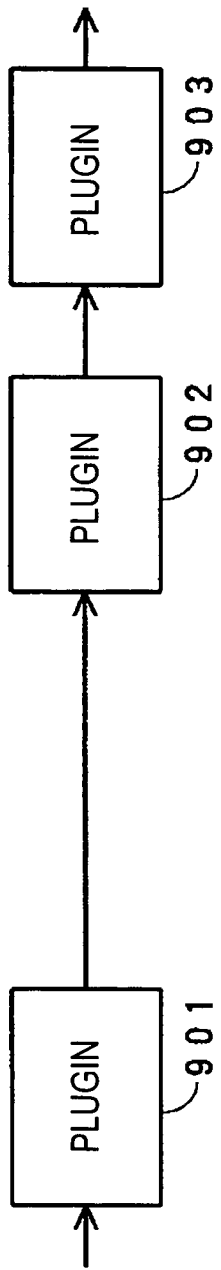
FIGS. 23A and 23B are diagrams showing an exemplary change of the circuit configuration of the signal processing apparatus according to the embodiment of the present invention by adding a plugin.
Figure 23B:
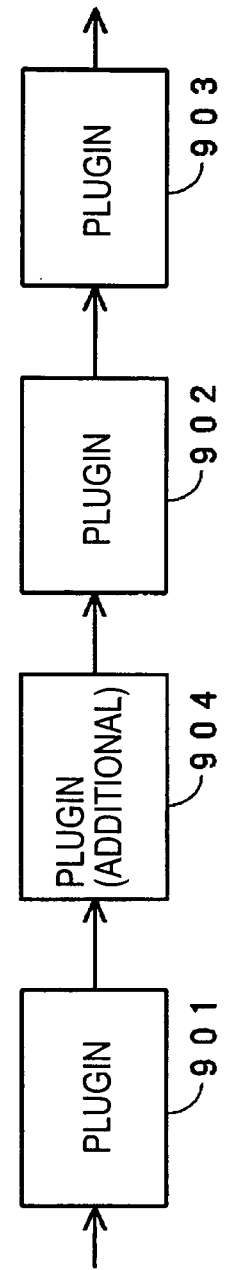

An instruction to change the circuit configuration is issued by the user instruction operation described above. For example, FIGS. 23A and 23B illustrate the change from a circuit configuration in which three plugins, i.e., plugins 901, 902, and 903, are serially connected to a circuit configuration in which a new plugin 904 is inserted between the plugins 901 and 902. In this case, the connection between the plugins 901 and 902 is deleted. Instead, a connection between the plugins 901 and 904 is set up, and a connection between the plugins 904 and 902 is set up.

FIGS. 24A and 24B illustrate the change from a circuit configuration in which four plugins, i.e., plugins 911, 912, 913, and 914, are serially connected to a circuit configuration in which the plugin 912 is deleted. In this case, the plugin 912 is deleted, and the connection between the plugins 912 and 913 and the connection between the plugins 911 and 912 are deleted. Instead, a connection between the plugins 911 and 913 is set up.

Figure 25A:
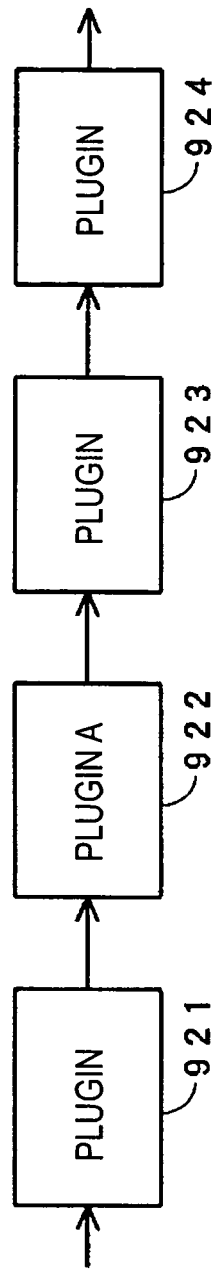
FIGS. 25A and 25B are diagrams showing an exemplary change of the circuit configuration of the signal processing apparatus according to the embodiment of the present invention by changing a plugin.
Figure 25B:
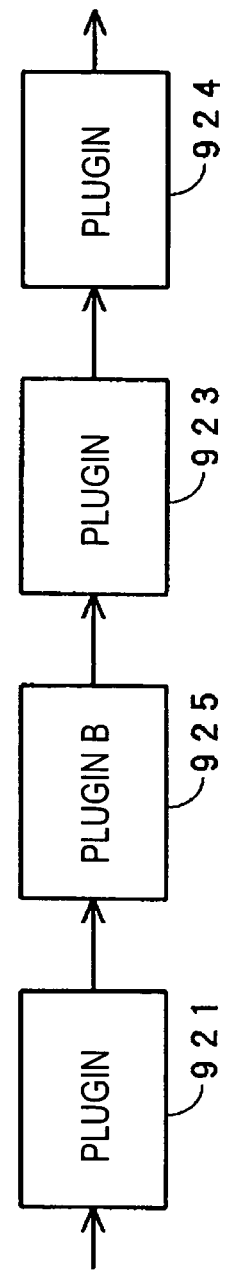

FIGS. 25A and 25B illustrate the change from a circuit configuration in which four plugins, i.e., plugins 921, 922, 923, and 924, are serially connected to a circuit configuration in which the plugin 922 is changed to a plugin 925.

In this case, the plugin 922 is deleted, and the connection between the plugins 921 and 922 and the connection between the plugins 922 and 923 are deleted. Instead, the plugin 925 is inserted, and connections between the plugins 921 and 925 and between the plugins 925 and 923 are set up.

Figure 26A:
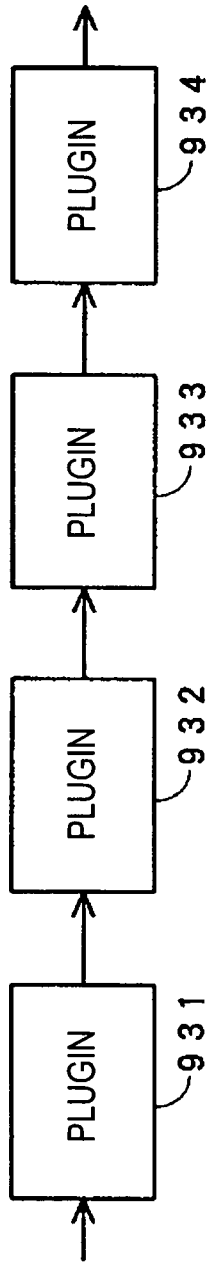
FIGS. 26A and 26B are diagrams showing an exemplary change of the circuit configuration of the signal processing apparatus according to the embodiment of the present invention by adding a connection.
Figure 26B:
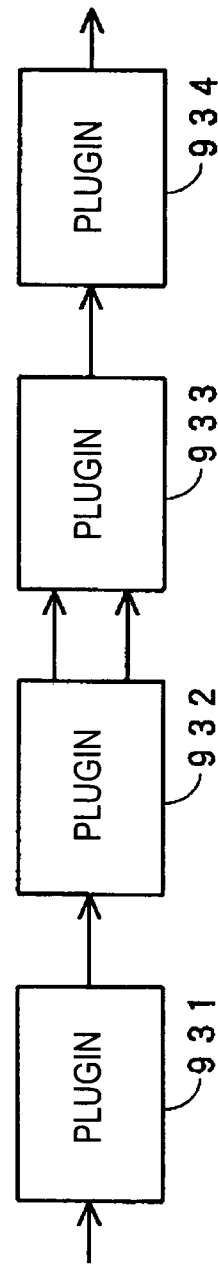

FIGS. 26A and 26B illustrate the change from a circuit configuration in which four plugins, i.e., plugins 931, 932, 933, and 934, are serially connected to a circuit configuration in which a connection between the plugins 932 and 933 is added.

Figure 27A:
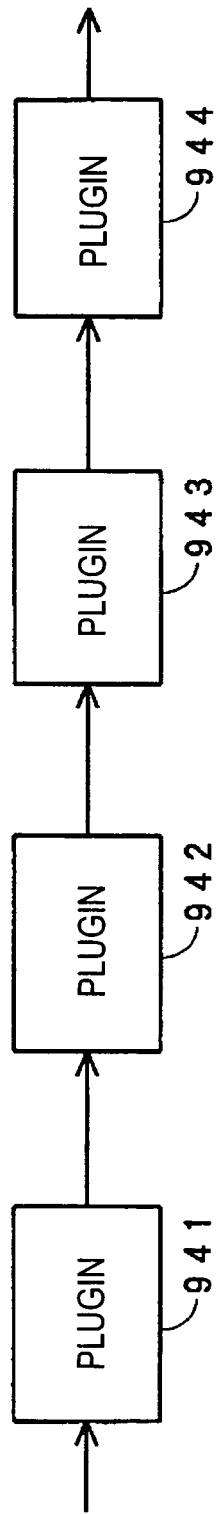
FIGS. 27A and 27B are diagrams showing an exemplary change of the circuit configuration of the signal processing apparatus according to the embodiment of the present invention by adding plugins and connections.
Figure 27B:
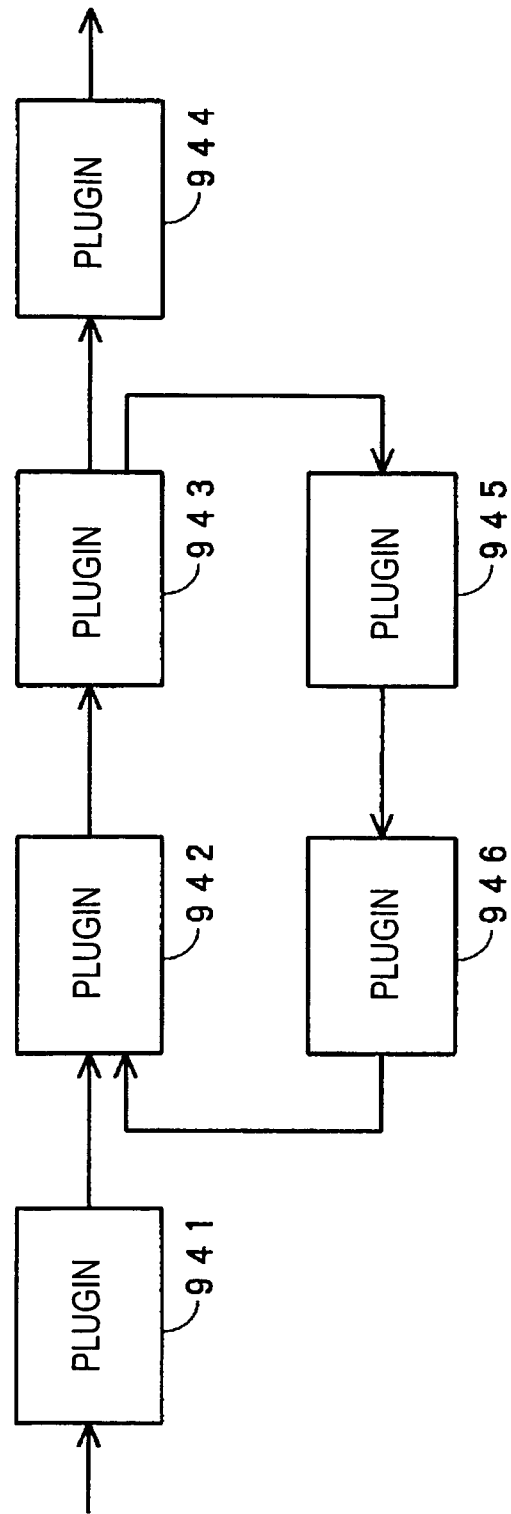

In the example shown in FIGS. 27A and 27B, a circuit configuration in which four plugins, i.e., plugins 941, 942, 943, and 944, are serially connected is changed to a circuit configuration in which two plugins, i.e., plugins 945 and 946, are added in a feedback loop between the plugins 943 and 942.

In the example shown in FIGS. 27A and 27B, the formation of the loop causes data to be mixed with the previous data, e.g., to be added to the previous data on a sample-by-sample basis. In this embodiment, however, there is no change of circuit configurations in the middle of data in packet units, and no problem occurs.

Second Dynamic Circuit-Configuration Changing Process

In the first process described above, when the user performs an operation of dynamically changing a circuit configuration via a GUI during signal processing, the operation is detected as a dynamic circuit-configuration change request. However, the method for issuing a dynamic circuit-configuration change request is not limited to the GUI-based operation of the user to change a circuit configuration.

In a second process, one or a plurality of circuit configurations to be used for the changing operation are held in advance as preset information during signal processing. FIGS. 28A and 28B illustrate an example of such preset information. In the example shown in FIGS. 28A and 28B, the original circuit configuration shown in FIG. 27A is stored as preset 1 (FIG. 28A), and the changed circuit configuration shown in FIG. 27B is stored as preset 2 (FIG. 28B).

The preset circuit information 1 and the preset circuit information 2 are registered in advance in the circuit configuration information storing and managing function unit 4 of the graph. Alternatively, the graph may be provided with a preset circuit information storage unit. In response to a circuit-configuration change request, specified preset circuit information may be read from the preset circuit information storage unit, and may be registered in the circuit configuration information storing and managing function unit 4.

The preset circuit information 2 may include all of the circuit information shown in FIG. 28B, or may include the circuit information of the difference portion represented by "additional" in FIG. 28B. In this case, the circuit information of the difference portion may be added to the circuit configuration shown in FIG. 28A, thereby obtaining the changed circuit configuration.

Accordingly, preset circuit information is specified from one or a plurality of pieces of preset circuit information by a user instruction operation, and the configuration of the graph is dynamically changed to the specified preset circuit information.

Figure 29:
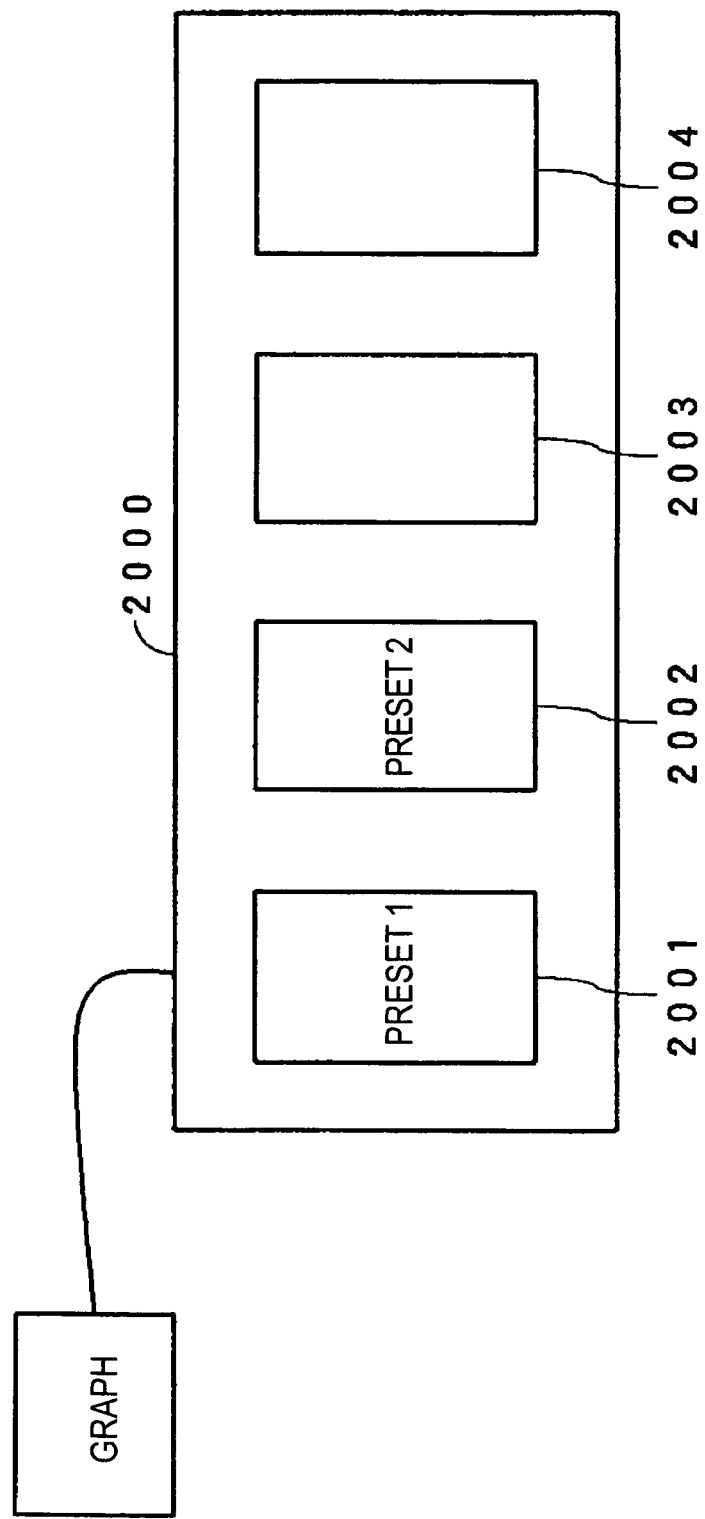
FIG. 29 is a diagram showing an exemplary change of the circuit configuration of the signal processing apparatus according to the embodiment of the present invention.

For example, in FIG. 29, a foot switch 2000 is employed. The foot switch 2000 includes pressing operation sections 2001, 2002, 2003, and 2004, which are foot-operated by the user. In this example, each of the pressing operation sections 2001, 2002, 2003, and 2004 is associated with preset circuit information. In the example shown in FIG. 29, the pressing operation section 2001 is associated with the preset circuit information 1, and the pressing operation section 2002 is associated with the preset circuit information 2.

For example, when the pressing operation section 2001 of the foot switch 2000 is pressed during signal processing, the corresponding operation information is transferred to the graph. The graph determines that the pressing operation section 2001 is pressed to issue a request to change to the preset circuit information 1, and performs a dynamic circuit changing process using the preset circuit information 1 held in the graph in a similar manner to that described above.

Like the embodiment described above, in the dynamic circuit-configuration changeable period described above with reference to FIG. 21, it is determined that the pressing operation section 2001 is pressed to issue a request to change to the preset circuit information 1, and the circuit changing operation is performed.

In FIG. 29, a foot switch is used to specify preset circuit information. Alternatively, preset circuit information may be specified by user speech. Advantageously, for example, the use of user speech allows a performer to generate specific speech to change a circuit configuration while giving a performance.

Figure 30:
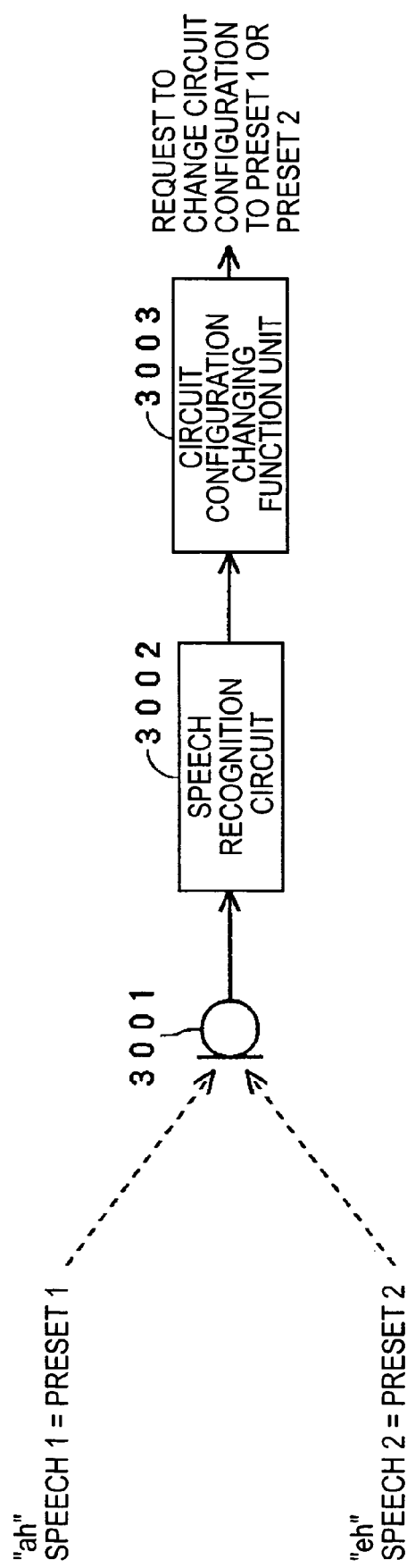
FIG. 30 is a diagram showing an exemplary change of the circuit configuration of the signal processing apparatus according to the embodiment of the present invention.

FIG. 30 illustrates a speech-based circuit-configuration change request. In this example, preset circuit information and user speech are associated in advance. In the example shown in FIG. 30, speech "ah" is associated with the preset circuit information 1, and speech "eh" is associated with the preset circuit information 2.

A microphone 3001 picks up user speech, and supplies a speech signal obtained by picking up the speech to a speech recognition circuit 3002. The speech recognition circuit 3002 recognizes speech "ah" or "eh" from the user, and transfers a recognition result to a circuit configuration changing function unit 3003. In response to the recognition result of speech "ah" from the user, the circuit configuration changing function unit 3003 issues a request to change to the preset circuit information 1. In response to the recognition result of speech "eh" from the user, the circuit configuration changing function unit 3003 issues a request to change to the preset circuit information 2.

In the example shown in FIG. 30, the speech recognition circuit 3002 and the circuit configuration changing function unit 3003 can be formed as plugins in the graph.

Third Dynamic Circuit-Configuration Changing Process

In the first and second processes described above, a dynamic circuit-configuration change request is issued through a user instruction. Instead of using a user instruction, a timing at which a circuit configuration is dynamically changed and circuit configuration information to be changed may be determined in advance, and a circuit configuration may be dynamically changed according to the determined control data.

Figure 31:
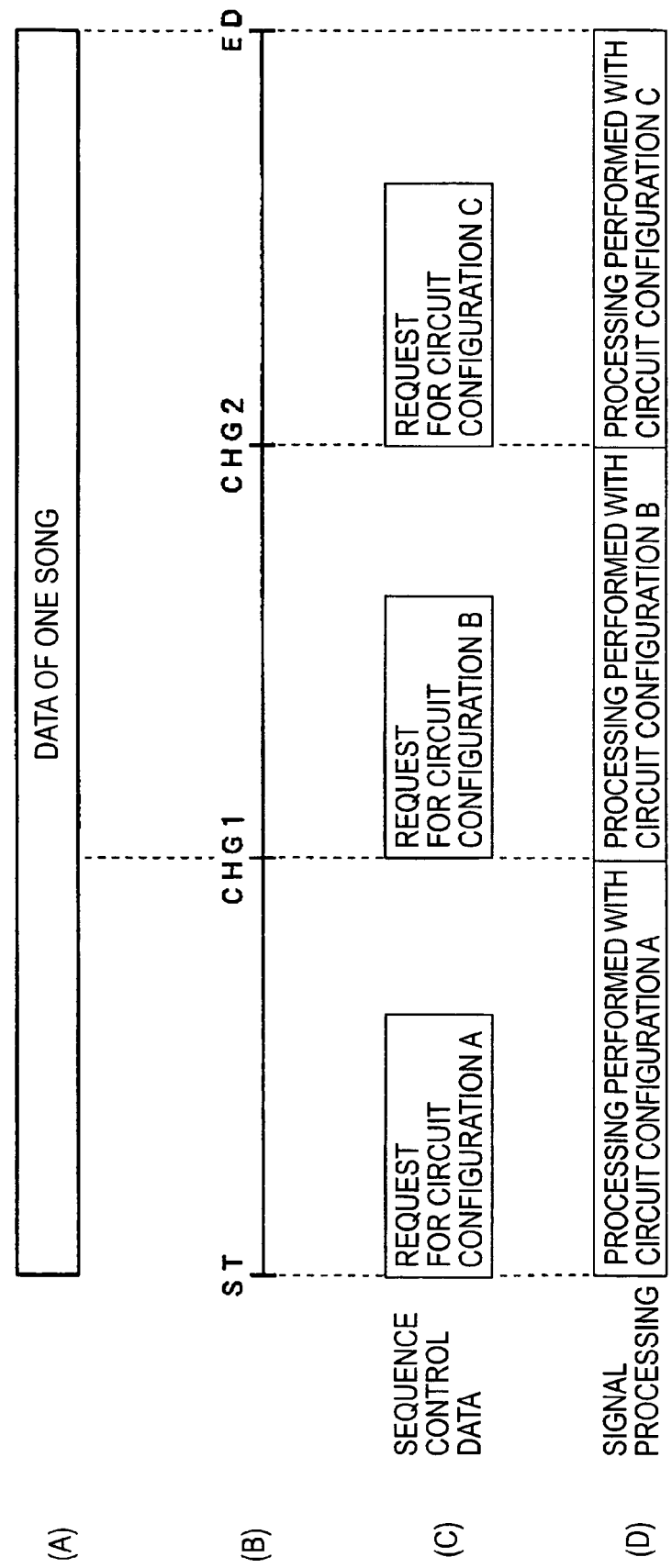
FIG. 31 is a diagram showing an exemplary change of the circuit configuration of the signal processing apparatus according to the embodiment of the present invention.

This is a case of a sequencer. For example, as shown in FIG. 31, in order to play back audio data of a song, the signal processing is performed with a circuit configuration A during a period from the start of the playback (ST) to a first change timing CHG1; the signal processing is performed with a circuit configuration B during a period from the first change timing CHG1 to a second change timing CHG2; and the signal processing is performed with a circuit configuration C during a period from the second change timing CHG2 to the end of the playback (ED).

Sequence control data is designed to issue a circuit configuration request to change to the circuit configuration A at the start of the playback (ST), a circuit configuration request to change to the circuit configuration B at the first change timing CHG1, and a circuit configuration request to change to the circuit configuration C at the second change timing CHG2.

Like the second process described above, the information of the circuit configurations A, B, and C is preset in the graph, and the sequence control data may simply include circuit configuration requests to change to the circuit configurations A, B, and C. Alternatively, the sequence control data may include the circuit configuration information of the circuit configurations A, B, and C, and the graph may obtain the circuit configuration information of the circuit configuration A, B, or C from the sequence control data to change the circuit configuration.

As discussed above, the graph manages the signal processing time, and monitors the change timing information (including the start time) included in the sequence control data. At a change timing, the graph changes the circuit configuration to the corresponding circuit configuration after the change timing.

According to the third process, signal processing can sequentially be performed according to predetermined order by the sequence control data while dynamically changing the signal processing circuit.

Exemplary Process to be Considered along with Dynamic Circuit Change

As discussed above, in this embodiment, data processing is performed in units of packets. The packet size is determined so that the overhead can be reduced as much as possible.

The packet size is substantially equivalent in concept to the depth of the FIFO (the number of stages). In general, there is merit of reducing a signal processing delay (latency) as the packet size decreases. Conversely, disadvantageously, the proportion of the overhead of signal processing increases, and the signal processing itself is not in time without maintaining the real-time performance. The more the complexity of signal processing, the more time may be needed for the signal processing. Thus, the possibility of not maintaining the real-time performance increases. In an environment where the delay bothers the user, such as a live-performance situation, it is desirable to reduce the packet size as much as possible in a range that allows the signal processing to be in time.

In the case of dynamic circuit change described above, with the changed circuit configuration, a predetermined packet size can be too small to support the processing speed.

In such a case, the signal processing may fail. In this embodiment, therefore, the following process is performed.

Figure 32:
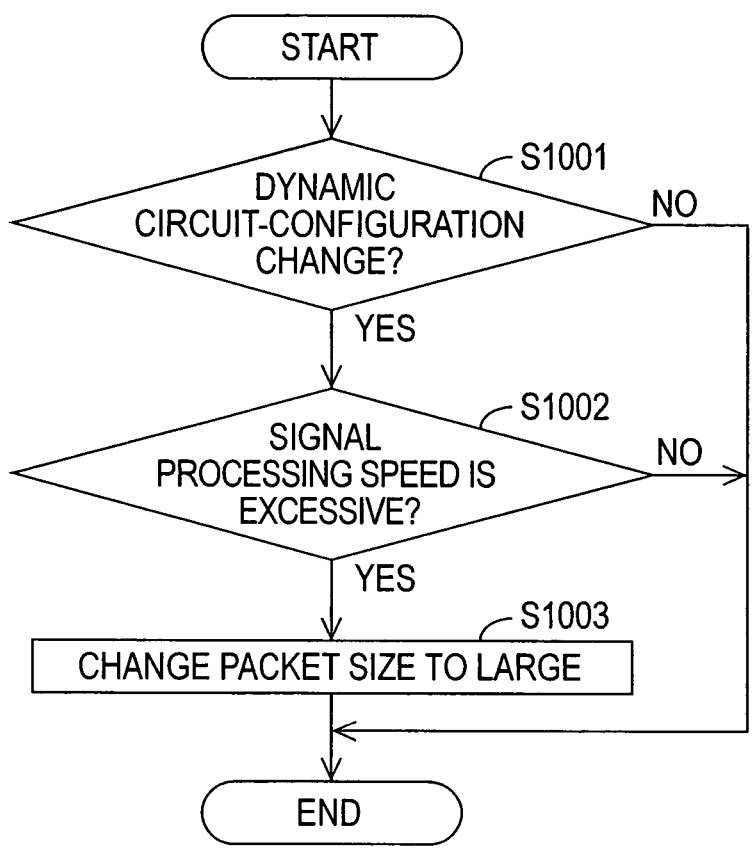
FIG. 32 is a flowchart showing an exemplary process involved with changing the circuit configuration of the signal processing apparatus according to the embodiment of the present invention.

FIG. 32 is a flowchart showing this process. The process shown in the flowchart of FIG. 32 is also executed by a graph.

First, it is determined whether or not the dynamic circuit-configuration change has been performed (step S1001). If it is determined that the dynamic circuit-configuration change has not been performed, the process routine exits.

If it is determined in step S1001 that the dynamic circuit-configuration change has been performed, it is determined whether or not the signal processing speed is excessive (step S1002). If not doing so, the process routine exits.

If it is determined in step S1002 that the signal processing speed is excessive, the packet size is changed to a larger size than the current size (step S1003).

Instead of changing the packet size to a large size, the user may be warned to change the packet size to a specified size.

The packet size changed in step S1003 may be selected by using packet sizes that are registered beforehand with priorities by the user according to the priority order.

Another Parameter Setting Method for Plugin

As discussed above, in the signal processing operation of the signal processing apparatus in this embodiment, a parameter attribute can be set. The parameter corresponds to, for example, in a case of a multiplier, a multiplication coefficient.

Typical middleware is configured such that the parameter is intermittently set or modified by a parameter-setting function from the user. In the example described above, as shown in FIG. 33, the signal processing apparatus of this embodiment is configured in a similar manner. Specifically, as shown in FIG. 6, the plugin 600 is provided with the parameter holding unit 604, and the parameter holding unit 604 is adapted to intermittently set or modify a parameter by a parameter-setting function from the user. In the example shown in FIG. 33, a signal processor 6010 is a gain control amplifier, and the gain of the amplifier 6010 is controlled by the parameter held by the parameter holding unit 604.

Figure 33:
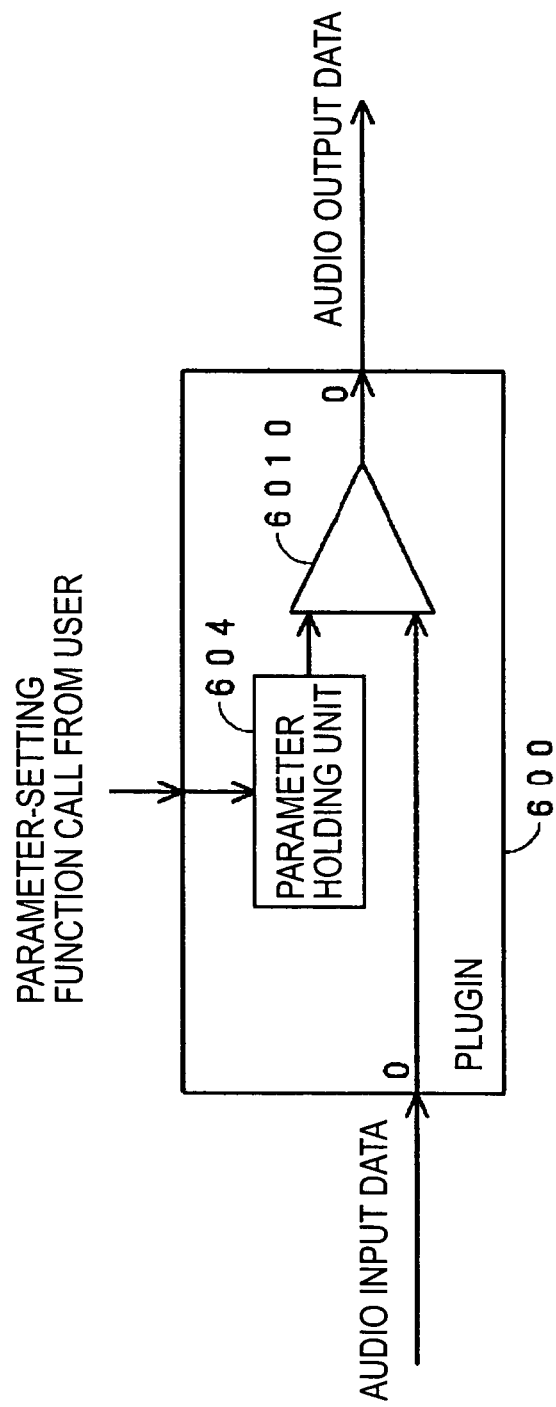
FIG. 33 is a diagram showing a parameter setting method for the signal processing apparatus according to the embodiment of the present invention.

In the structure shown in FIG. 33, it is difficult to change the parameter continuously accurately in units of, for example, one sample. This is because it is difficult for a general OS to maintain the real-time performance with respect to one sample time (about 20 microseconds) of an audio data sample, resulting in intervals between function calls as large as several tens of milliseconds. On a general OS, if the real-time performance can be maintained, the limit of the accuracy is several milliseconds to several tens of milliseconds. Further, time variations specific to software make it difficult to control a call timing of a parameter-changing function with sample accuracy on the order of microseconds.

In this embodiment, therefore, as discussed below, a parameter setting method is designed so that the parameter can be changed accurately with one-sample accuracy. In this example, specifically, the parameter to be held in the plugin is not set by a function call from the user but by a novel parameter setting method in which the graph is provided with a function for assigning the parameter to the input port of the plugin to set it. The novel parameter setting method is hereinafter referred to as a "parameter bind".

Figure 34:
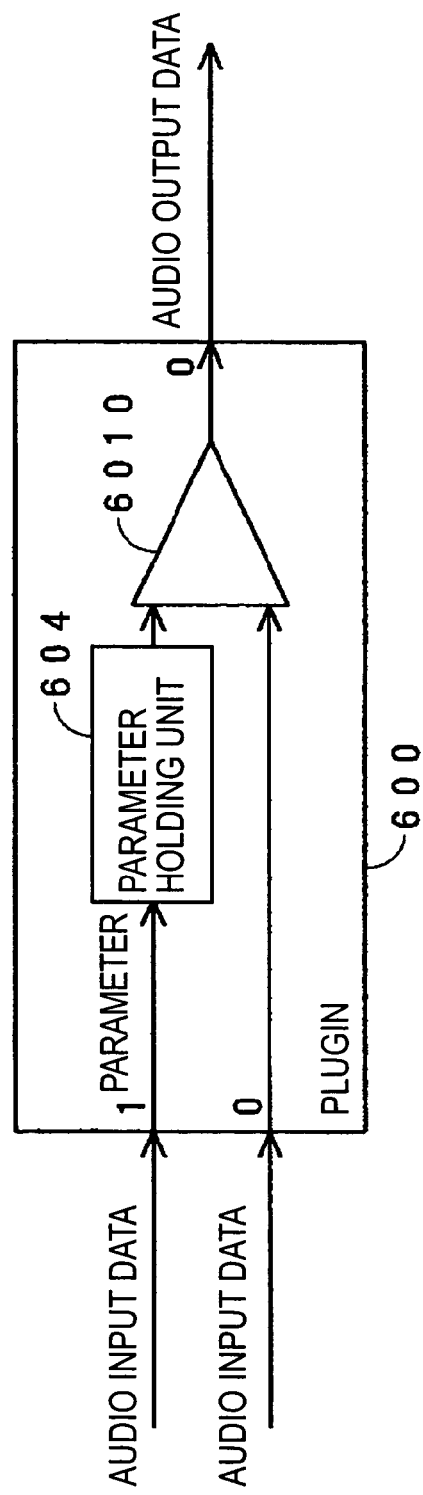
FIG. 34 is a diagram showing another parameter setting method for the signal processing apparatus according to the embodiment of the present invention.

FIG. 34 illustrates an exemplary parameter bind. New input port 1 is set in a plugin, and the input port 1 is connected to the parameter holding unit 604. The new input port 1 is assigned an audio data value.

The parameter within the plugin is updated by the audio data value input to the input port 1, rather than by a setting function call from the user. The audio data value is directly used as a parameter value, and is updated on a sample-by-sample basis.

There is no particular discrimination between the parameter and the audio data. In this embodiment, since all audio data is synchronous with sample accuracy, the synchronism between the change in parameter and the audio data is maintained. For example, the user simultaneously generates a parameter signal to be synchronized with audio data, and inputs the generated parameter signal to the input port connected to the parameter holding unit for the desired plugin, thereby achieving the change in parameter in synchronization with the audio data with sample accuracy.

Figure 35:
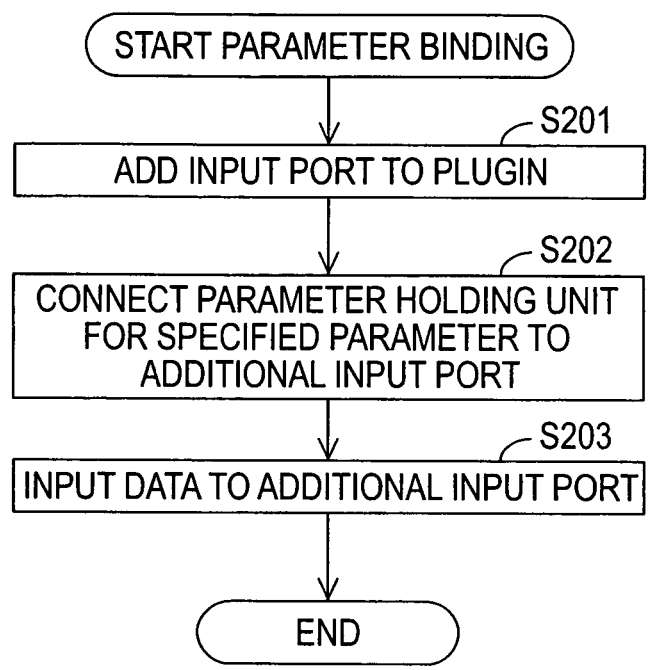
FIG. 35 is a flowchart showing an exemplary implementation of the parameter setting method shown in FIG. 34.

FIG. 35 illustrates a procedure for registering a parameter bind in a graph. First, a plugin that executes a parameter bind is additionally provided with an input port for the parameter bind (step S201). Then, a parameter holding unit in which a specified parameter is held is connected to the input port added in step S201 (step S202).

Then, audio data serving as a parameter is input to the additional input port (step S203). Then, the registration of the parameter bind in the graph ends.

Figure 36:
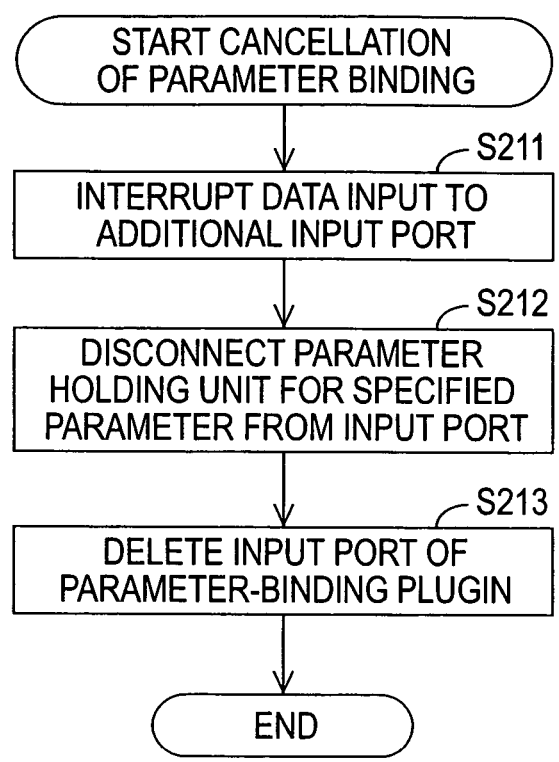
FIG. 36 is a flowchart showing another exemplary implementation of the parameter setting method shown in FIG. 34.

FIG. 36 illustrates a procedure for canceling the registered parameter bind. First, the data input to the additional input port of the predetermined plugin for the parameter bind is interrupted (step S211). Then, the input port to which the data input is interrupted is disconnected from the parameter holding unit in which the specified parameter is to be held (step S212). Then, the input port to which the data input is interrupted is deleted (step S213). Then, the procedure for canceling the registered parameter bind from the graph ends.

The registration and cancellation of a parameter bind can be performed at any timing even during signal processing.

Real-Time Distribution Process

The signal processing apparatus of the above-described embodiment is normally implemented by a single computer, and signal processing is performed on the single computer. This processing is extensively performed on a plurality of computers connected via a network, thereby ensuing a distribution of the CPU load in real time.

The distribution processing can be achieved by utilizing a distributed object technology, which is a general computing technology, such as COM/DCOM (Component Object Model/Distributed Component Object Model) or CORBA (Common Object Request Broker Architecture).

The distribution processing will be described hereinbelow in the context of the COM/DCOM technology, which is mainly used in Windows® OSs. First, all plugin objects in the middleware of this embodiment are implemented as COM objects. A COM object is an object-oriented component model, and has the feature of location transparency. The location transparency allows a COM object to be generated on a remote computer as if the COM object were generated on, for example, a local computer.

With the location transparency, objects are generated on either a local computer or a remote computer by performing the same operation. That is, plugin objects, which are COM objects, are uniformly generated on a plurality of computers without paying attention to networks. Operations other than the generation of plugins are also achievable with uniform operability on either a local computer or a remote computer.

For example, audio input and output plugin objects may be placed on a local computer, and echo plugin objects may be placed on a remote computer. As a whole, a single circuit may be set up.

FIG. 37 shows an exemplary graph to be subjected to real-time distribution processing. In the example shown in FIG. 37, in an environment where a local computer 1000 and a remote computer 2000 are connected via a network 3000, a root graph 2500 is defined and a circuit is created.

The flow of creating a circuit will now be described with reference to FIG. 37. A user creates a circuit in a similar manner to that for creating a circuit using only the local computer 1000. The user draws attention to the remote computer 2000 only in a portion of the processing.

(1) The user creates an object of the graph 2500. The object of the graph 2500 is created on the local computer 1000.

(2) The user instructs the object of the graph 2500 to create an object of a plugin 2501.

(3) The user instructs the object of the graph 2500 to create an object of a plugin 2502.

(4) The user instructs the object of the graph 2500 to create an object of a plugin 2503. In this case, the plugin-generation functions are assigned an identifier of the remote computer 2000.

(5) The user instructs the object of the graph 2500 to create an object of a plugin 2504.

(6) The user instructs the object of the graph 2500 to connect output port 0 of the plugin 2501 and input port 0 of the plugin 2502.

(7) The user instructs the object of the graph 2500 to connect output port 0 of the plugin 2502 to input port 0 of the plugin 2503.

(8) The user instructs the object of the graph 2500 to connect output port 0 of the plugin 2503 and input port 0 of the plugin 2504.

(9) The user instructs the object of the graph 2500 to connect output port 0 of the plugin 2504 and input port 1 of the plugin 2502.

Thus, the circuit is set up. The user draws attention to the remote computer 2000 only in the step (4). The user can perform the signal processing in a similar manner to that with the use of only the local computer 1000.

The embodiment discussed above achieves the following advantages.

According to the above-described embodiment, in software digital signal processing, it is possible to create a circuit without increased processing delay if signal processing circuits are connected in multiple stages. It is also possible to create any desired digital signal processing circuit including a feedback structure.

Further, it is possible to dynamically change the circuit configuration of the digital signal processing circuit. Dynamically updatable circuit elements are:

the addition or deletion of a plugin;

the connection between plugins;

the addition or deletion of an input or output port of a plugin;

the change of a parameter of a plugin and parameter binding; and parameters relating to signal processing, such as the packet size and the sampling frequency in signal processing.

By incorporating the middleware of the signal processing apparatus of this embodiment into products, the products whose circuit configuration is dynamically changeable can be manufactured.

Further, the thus created signal processing circuit is stored in a file, thus allowing the signal processing circuit to be recovered later. This file is exchanged to facilitate replacement or reuse of the circuit.

If the signal processing circuit has a circuit configuration including a feedback loop, the number of calls of signal-processing functions can be minimized, resulting in low CPU load needed to perform real-time signal processing.

Further, the synchronism between the updating of a circuit parameter and audio data can be controlled with sample accuracy. A parameter value can be updated using the audio data (parameter binding function).

Further, it is possible to perform real-time distribution processing using a network. A plurality of circuits on the network can synchronously be operated in real time.

It should be understood by those skilled in the art that various modifications, combinations, sub-combinations and alterations may occur depending on design requirements and other factors insofar as they are within the scope of the appended claims or the equivalents thereof.

What is claimed is:

1. A signal-processing apparatus for performing signal-processing comprising:

at least one processor programmed to:

perform a plurality of unit signal-processing steps using a plurality of signal-processing modules;

store and manage the plurality of signal-processing modules and circuit configuration information represented by a virtual connection state of inputs and outputs of the plurality of signal-processing modules;

determine a signal-processing order of the plurality of signal-processing modules forming the circuit configuration information by performing path routing;

execute the plurality of unit signal-processing steps by sequentially enabling the plurality of signal-processing modules in the determined signal-processing order; and determine whether a circuit-configuration change request from a user is received during the execution of the plurality of unit signal-processing steps and, in response to determining that the circuit-configuration change request from the user is received:

change the circuit configuration information; and re-execute the path routing to determine a signal-processing order of the plurality of signal-processing modules forming the changed circuit configuration information during a period from an end of signal-processing in a processing data unit to a beginning of a subsequent processing data unit, wherein the path routing comprises analyzing a plurality of signal-processing orders for the plurality of signal-processing modules and selecting based, at least in part, on a processing metric, one of the plurality of signal-processing orders, wherein signal-processing from the beginning of the subsequent processing data unit is performed with the changed circuit configuration information.

2. The signal-processing apparatus according to claim 1, wherein the at least one processor is further programmed to:

receive a generation or deletion instruction from a user to generate or delete a signal-processing module and a connection instruction from the user to connect the inputs and the outputs of the plurality of signal-processing modules; and set up a virtual connection between the inputs and the outputs of the plurality of signal-processing modules in response to the connection instruction from the user, wherein the determined circuit-configuration change request is at least one of the generation or deletion instruction from the user and the connection instruction from the user.

3. The signal-processing apparatus according to claim 1, wherein circuit configuration information different from the circuit configuration information that is currently being used by the at least one processor to perform the signal-processing is a preset circuit configuration information, and when a circuit-configuration switching instruction is issued from the user during the executed plurality of unit signal-processing steps, the circuit-configuration switching instruction is determined as the circuit-configuration change request, and changes the circuit configuration information to the preset circuit configuration information, and re-executes the path routing to determine a signal-processing order of the plurality of signal-processing modules forming the changed circuit configuration information.

4. The signal-processing apparatus according to claim 3, wherein the preset circuit configuration information includes a plurality of pieces of circuit configuration information, and the circuit-configuration switching instruction includes information specifying which piece of circuit configuration information in the plurality of pieces of circuit configuration information to switch to.

5. The signal-processing apparatus according to claim 3, wherein the circuit-configuration switching instruction from the user is issued by the user operating a foot switch.

6. The signal-processing apparatus according to claim 3, wherein the circuit-configuration switching instruction from the user is issued by user speech.

7. The signal-processing apparatus according to claim 1, wherein the at least one processor is further programmed to:
- instruct a storage unit to store one or more pieces of the circuit configuration information and instruction information specifying which timing of the signal-processing to use the stored circuit configuration information; and
- monitor the instruction information stored in the storage unit during the signalprocessing,
- wherein, when detecting the circuit-configuration change request, the at least one processor is further programmed to:
  - obtain the changed circuit configuration information from the storage unit;
  - store the changed circuit configuration information; and
  - re-execute the path routing to determine a signal-processing order of the plurality of signal-processing modules forming the changed circuit configuration information during a period from the end of the signal-processing in the processing data unit to the beginning of the subsequent processing data unit.

8. The signal-processing apparatus according to claim 1, wherein the processing metric comprises an amount of time required to perform sequential calculations for the plurality of signal-processing modules when arranged in a particular order.

9. A signal-processing method for performing signal-processing including a plurality of unit signal-processing steps in processing data units by means of signal-processing, each processing data unit having a predetermined number of data samples, the signal-processing method comprising:
- performing, by at least one processor, the plurality of unit signal-processing steps, respectively, using a plurality of signal-processing modules;
- storing and managing the plurality of signal-processing modules and circuit configuration information represented by a virtual connection state of inputs and outputs of the plurality of signal-processing modules;
- determining a signal-processing order of the plurality of signal-processing modules forming the circuit configuration information by performing path routing;
- executing the signal-processing by sequentially enabling the plurality of signal-processing modules in the determined signal-processing order; and
- determining whether a circuit-configuration change request from a user is received during the execution of the signal-processing, and in response to determining that the circuit-configuration change request from the user is received:
  - changing the circuit configuration information; and
  - re-executing the path routing to determine a signal-processing order of the plurality of signal-processing modules forming the changed circuit configuration information during a period from an end of the signal-processing in a processing data unit to a beginning of a subsequent processing data unit, wherein the path routing comprises analyzing a plurality of signal-processing orders for the plurality of signal-processing modules and selecting based, at least in part, on a processing metric, one of the plurality of signal-processing orders,
- wherein signal-processing from the beginning of the subsequent processing data unit is performed with the changed circuit configuration information.

* * * * *